US005293587A

United States Patent [19]

Deb et al.

[11] Patent Number: 5,293,587

[45] Date of Patent: Mar. 8, 1994

[54] TERMINAL CONTROL CIRCUITRY WITH DISPLAY LIST PROCESSOR THAT FETCHES INSTRUCTIONS FROM A PROGRAM MEMORY, CHARACTER CODES FROM A DISPLAY MEMORY, AND CHARACTER SEGMENT BITMAPS FROM A FONT MEMORY

[75] Inventors: Alak K. Deb, San Jose; Yungha Y. Han, Cupertino; Morris E. Jones, Jr., Saratoga, all of Calif.

[73] Assignee: Chips and Technologies, Inc., San Jose, Calif.

[21] Appl. No.: 532,264

[22] Filed: Jun. 1, 1990

[51] Int. Cl.[5] .............................................. G06F 15/62

[52] U.S. Cl. .................................... 395/162; 395/150; 395/164; 395/166

[58] Field of Search ................................ 395/162-166, 395/137-139, 145-150, 114

[56] References Cited

U.S. PATENT DOCUMENTS

| | | | |
|---|---|---|---|
| 4,345,245 | 8/1982 | Vella et al. | 340/744 |
| 4,346,377 | 8/1982 | Green | 340/731 |
| 4,527,252 | 7/1985 | Donohue et al. | 364/900 |
| 4,533,910 | 8/1985 | Sukonick et al. | 395/139 X |
| 4,843,405 | 6/1989 | Morikawa et al. | 346/1.1 |
| 4,907,172 | 3/1990 | Nishiyama et al. | 364/518 |
| 4,992,956 | 2/1991 | Kaku et al. | 395/114 |
| 5,086,497 | 2/1992 | Horikawa et al. | 395/148 X |

*Primary Examiner*—Gary V. Harkcom

*Assistant Examiner*—Almis Jankus

*Attorney, Agent, or Firm*—Townsend and Townsend Khourie and Crew

[57] ABSTRACT

Display control logic for a terminal controller with support for such features as windows and interlace. A display list processor (DLP) (20) communicates with a program memory (12) containing DLP instructions, a display memory (12) containing character codes and attributes for the display, and a font memory (13). As the DLP program executes, it causes accesses to the display memory and brings in character codes and attributes for ultimate display on the screen. These character codes and attributes, as well as information representative of the scan line are input to a video data queue (95). The queue entries are clocked out of the queue by a character clock (170) and are used to generate addresses to font memory. Bitmaps from font memory are read into a dot shifter (190). The DLP instruction set includes a DISPLAY STRING instruction which allows a portion of a scan line to be built up by specifying the length of the scan line segment and the starting address in memory. Thus, a scan line can be built up based on characters stored in different parts of memory. The instruction set also includes SET ROW, LOOP, and LOOPBACK instructions to specify a given row and to set up a loop so that all the scan lines in a given row of characters can be built up by repeated executions of the DISPLAY STRING instructions. It is also possible, to display the scan lines in any random scan line order.

25 Claims, 6 Drawing Sheets

TERMINAL CONTROL CIRCUITRY WITH DISPLAY LIST PROCESSOR THAT FETCHES INSTRUCTIONS FROM A PROGRAM MEMORY, CHARACTER CODES FROM A DISPLAY MEMORY, AND CHARACTER SEGMENT BITMAPS FROM A FONT MEMORY

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to terminal controllers and more specifically to techniques for placing characters on a display.

One of the main functions of a terminal is to place rows of characters on a screen. Associated with the terminal is a display memory (also sometimes referred to as a screen buffer, video buffer, or coax buffer), which stores a character code and attribute for each character position on the screen. The display data are updated from the keyboard and from communications with the host computer. Font bitmaps for the characters are typically stored in a separate non-volatile font memory. In order to place a row of characters on the screen, repeated accesses are made to the display memory, appropriate locations in the font memory are accessed to build up the row of characters, a scan line at a time. This is a fairly straightforward process, since a given position on the screen corresponds to a given location in the display memory, and a given character code corresponds to a known starting address in font memory, with the particular scan line providing a known and predictable offset.

One level of sophistication is the provision of one or more windows on the screen. In this context, a window refers to a region of the display which is to contain characters typically unrelated to the characters in the surrounding region. Normally, a separate window buffer is provided for the window, and relevant portions of the display memory are overwritten with a copy of the relevant portions of the window buffer.

Sophistication is sometimes another word for complication, which is the case here. Providing windows requires extra memory and extra overhead in transferring blocks of memory from one place to another.

A further level of sophistication is supporting interlaced scanning. As is well known, an interlaced display typically provides a given level of resolution at a cheaper price. A normal CRT controller typically supports either non-interlace or single interlace scanning. Support of three-way or four-way interlace would presumably require additional circuitry.

SUMMARY OF THE INVENTION

The present invention provides display control logic for a terminal controller with support for such features as windows and interlace. The invention operates in a manner that is flexible and efficient in terms of memory and circuitry.

The basis for the improved operation is a display list processor (DLP) having a small but powerful instruction set that allows scan lines to be built up in a very flexible way. The DLP communicates with a program memory containing DLP instructions, a display memory containing character codes and attributes for the display, and a font memory containing bitmaps for the character fonts.

As the DLP program executes, it causes accesses to the display memory and brings in character codes and attributes for ultimate display on the screen. These character codes and attributes, as well as information representative of the scan line are input to a video data queue. The queue entries are clocked out of the queue by a character clock synchronized to the display, the character code and scan line information is used to generate addresses to font memory, and the bitmaps are read from font memory into a dot shifter. The dot shifter is clocked out by a dot clock synchronized to the display.

The DLP instruction set includes a DISPLAY STRING instruction which allows a portion of a scan line to be built up by specifying the length of the scan line segment and the starting address in memory. Thus, by executing a series of such instructions, a scan line can be built up based on characters stored in different parts of memory. The instruction set also includes SET ROW, LOOP, and LOOPBACK instructions to specify a given row and to set up a loop so that all the scan lines in a given row of characters can be built up by repeated executions of the DISPLAY STRING instructions.

One consequence of the DLP's ability to create scan line segments of specified length and origin is that the scan lines and hence the rows of characters can be built up with portions taken from different parts of the memory. Thus windows can be set up without having to transfer data from one portion of memory to another. Rather, data is directly accessed and converted into bit streams.

Similarly, since the DLP builds up the display a scan line at a time, it is possible, by suitable programming, to display the scan lines in any random scan line order. However, the special looping instructions are provided to display scan lines sequentially. By incrementing the loop counter by amounts other than one, it is possible to make interlaced, tri-interlaced, and quad-interlaced displays without any special hardware.

In a preferred embodiment, the DLP is incorporated into a single-chip terminal controller which also includes a RISC-based processor for handling terminal communications and other non-display operations. Program and data memories are preferably off-chip for flexibility. An external micro-processor may be used to support high-end terminal operations.

A further understanding of the nature and advantages of the present invention may be realized by reference to the remaining portions of the specification and the attached drawings.

DESCRIPTION OF SPECIFIC EMBODIMENTS

System Overview

Figure 1:
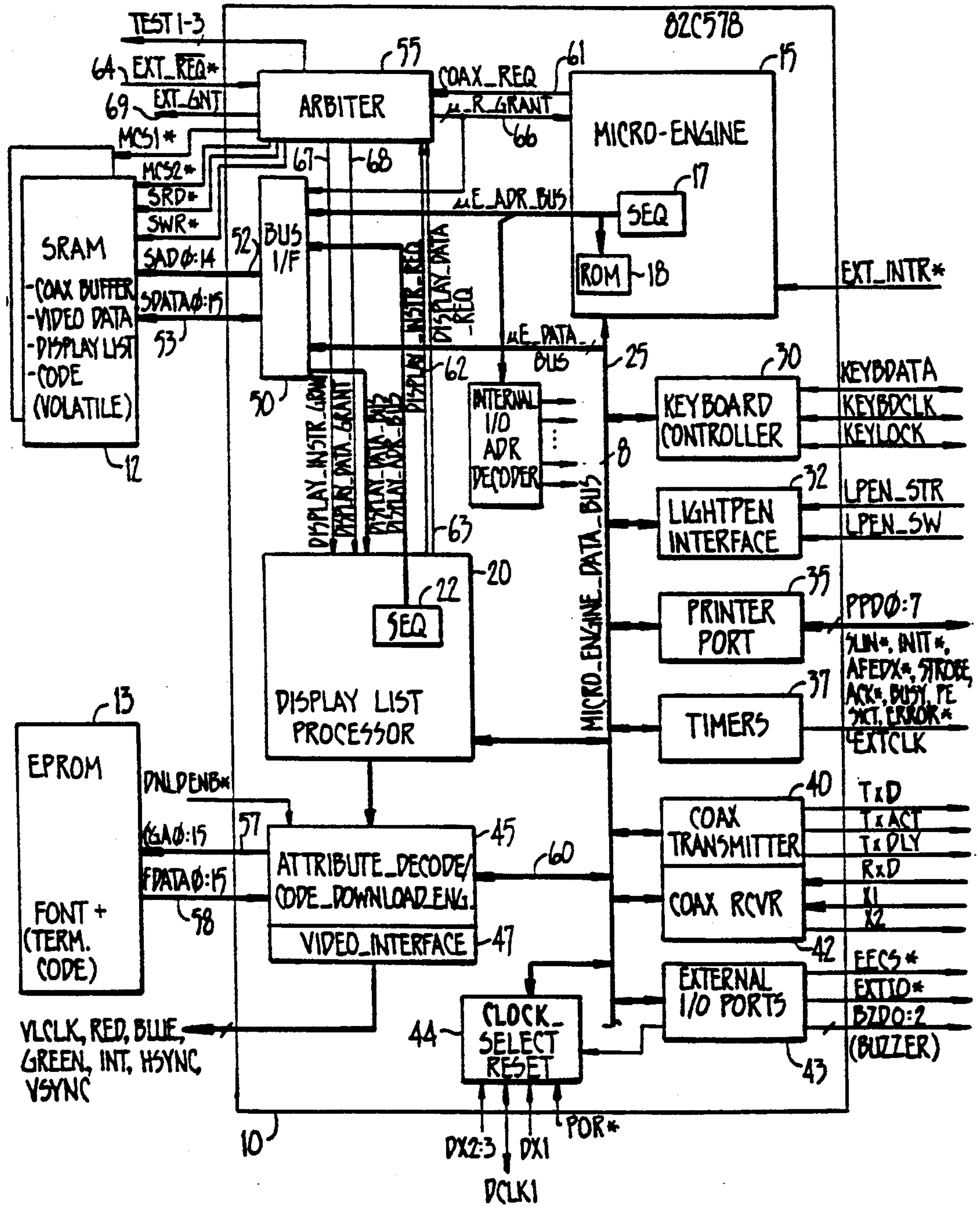
FIG. 1 is a block diagram of a single chip terminal controller embodying the present invention, including its connections with associated memories.

FIG. 1 is a block diagram of a single chip terminal controller (TC) 10 and associated memories including a system memory 12 and a font/code memory 13. TC 10 includes two on-board processors, a main processor, referred to as micro-engine 15 (with an associated sequencer 17 and on-chip ROM 18) for handling terminal and communication operation, and a display list processor (DLP) 20 (with associated sequencer 22) for handling the display. Micro-engine 15 communicates with a number of peripheral interfaces via an internal data bus 25. These include a keyboard controller 30, a light pen interface 32, a printer port 35, a set of timers 37, a serial (coax) interface having a coax transmitter 40 and a coax receiver 42, a set of external I/O ports 43 (which include a buzzer interface), and clock select logic 44. DLP 20 communicates with an attribute decoder 45 (having associated download logic) and associated video interface 47 to control a display such as a monochrome or color monitor (not shown).

System memory 12 is implemented as two 8K×8 static random access memory (SRAM) chips (one 32K×16 or two 32K×8 maximum) and is used to store micro-engine and DLP programs, video data for refresh, and coax data. Font/code memory 13 is implemented as a 32K×8 electrically programmable read only memory (EPROM) chip (64K×16 maximum) and is used to store font bitmaps for the display. It is also used to store code for downloading to system memory 12 at power up. The portions of font/code memory 13 used to store the fonts will sometimes be referred to as font memory.

Micro-engine 15 and DLP 20 are coupled via respective internal buses to a bus interface 50, which provides address lines 52 and bidirectional data lines 53 to system memory 12. A three-way arbiter 55 arbitrates cycles to allow the micro-engine, the DLP, and an optional external processor to access the memory.

Attribute decoder 45 is coupled to font/code memory 13 via address lines 57 and data lines 58, and to internal data bus 25 via a set of lines 60. The latter connection provides a data path between font/code memory 13 and system memory 12, thereby making it possible for logic associated with attribute decoder 45 to download code stored in the font/code memory to the system memory at power up. This is advantageous since SRAMs are typically much faster than EPROMs.

Micro-engine 15 is a high-speed reduced instruction set computer (RISC) for handling terminal operation, and has three states, a main state, a coax state, and an interrupt state. It includes an ALU, general purpose registers and special purpose registers associated with the various states, an accumulator with a zero, carry, and overflow flag for each state, and a program counter for each state with a three-deep pushdown stack for the main state. On-chip ROM 18 contains an initial program loader (IPL) which is executed at power up to effect the downloading from font/code memory 13 to system memory 12.

DLP 20 with its associated sequencer 22, attribute decoder 45, and video interface 47 provides overall display control. Sync signals for the display monitor and display format management are generated as a result of executing a sequence of instructions stored in system memory 12. The DLP retrieves character code and attributes from the display buffer in system memory 12 while logic associated with the attribute decoder retrieves character font information from font memory 13 so as to define the actual signals sent to the display. The DLP is pipelined and buffered to be able to sustain a 60 MHz video pixel rate without screen flickers. The attribute decode logic handles the 3270 attributes and supports background color select, color remapping, 2/4 color mode select, and the like. Video interface 47 provides RGB color signals for a color monitor (or a mono signal for a monochrome monitor), an intensity signal, horizontal and vertical sync signals, and video dot clock signals.

Keyboard interface 30 allows direct connection to an AT or PS/2 style keyboard. The interface provides open collector bidirectional pins for data and clock information for the data being exchanged. Printer interface 35 provides a bidirectional parallel port data bus and a number of control signals.

Data for coax transmission is encoded using the biphase Manchester II technique which has a fixed bit rate of 2.3587 MHz. In this encoding, the first half of the bit cell consists of the complementary data and the second half of the bit cell is the true data. There is always a central bit transition in the normal bit cell except in the transmission starting sequence which have the code violations in the frame. Received coax data is assumed to have the same encoding, and is decoded accordingly.

Clock select logic 44 performs a number of functions. First, it receives as inputs up to three external clock signals, designated DX1, DX2, and DX3, and provides as an external output a buffered version of DX1, designated DCLK1. Second, it responds to signals on data bus 25 to select one of the input clocks for micro-engine 15 and one for the video. Third, it receives the 18.8696-MHz X1 clock (input to coax receiver 42), and provides a frequency divided version (÷8), called the slow clock, for use by timers 37 and by the micro-engine at power up and during downloading from font/code memory 13 to system memory 12.

In one implementation, DX1 is 26.288 MHz and is used for both the micro-engine and display; in another DX1 is 35 MHz and is used for the micro-engine while DX2 is 64 MHz and is used for the display.

Arbiter 55 arbitrates cycles to allow micro-engine reads and writes, DLP instruction reads, DLP data reads, micro-engine coax interrupt processing, and (optional) external processor reads and writes. To this end, the arbiter receives micro-engine coax interrupt requests, DLP instruction requests, DLP data requests, and external processor requests on respective request lines 61, 62, 63, and 64. Memory cycles are granted by asserting signals on respective grant lines 66, 67, 68, and 69.

Display Control Logic Overview

Figure 2:
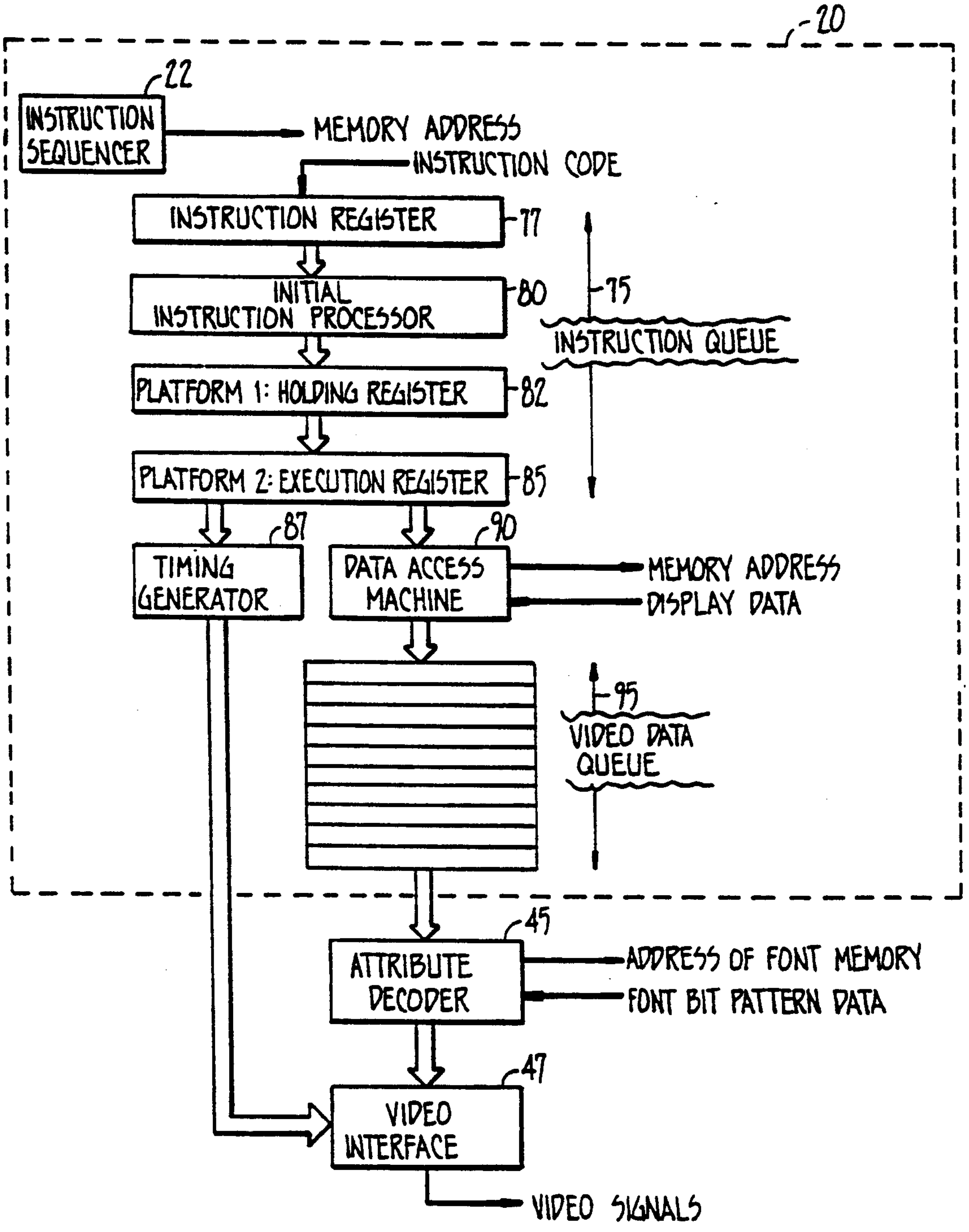
FIG. 2 is a block diagram of the display control logic portion of the terminal controller chip.

FIG. 2 is a block diagram of DLP 20, attribute decoder 45, and video interface 47, which together constitute the display control logic. The basic operation is the fetching and execution of DLP instructions so as to generate a stream of character codes and other information, and the conversion of the codes and other information to video information for the display, as will now be described.

As a prefatory matter, it is noted that a portion of system memory 12 is dedicated to a display buffer in which are stored character codes (e.g., device buffer code representations) and other information such as character and line attributes. Another portion of the system memory is used to store instructions for the DLP.

Instruction sequencer 22 generates addresses to system memory 12 to access stored DLP instructions. These instructions are loaded into a pipelined instruction queue 75 that includes an instruction register (IR) 77, an initial instruction processor (IIP) 80, a holding register set 82 (also referred to as Platform 1 or P1), and an execution register/counter set 85 (also referred to as Platform 2 or P2). A certain class of DLP instructions, referred to as control instructions, are immediately executed by IIP 80 while other instructions, referred to as video instructions, are formatted and passed on to holding register set 82. The IIP may also add existing information that is not present in the current video instruction.

The video instructions include portions that relate to timing and portions that relate to the character codes and attributes to be displayed. The timing fields are communicated to a timing generator 87 while the other portions are communicated to a display data access machine 90. For those video instructions requiring access to system memory 12, display data access machine 90 generates memory addresses to the display buffer in system memory 12, and appropriately formats the display data received from the display buffer. For other instructions, it may pass the information through. The outputs from display data access machine 90 are communicated to a 10-deep video data queue 95. The DLP instruction set has the property that it allows portions of the display buffer to be accessed in any desired order.

Attribute decoder 45 receives the character codes and control information from video data queue 75. Associated logic generates suitable addresses to access the relevant portions of font memory 13. The DLP instruction set has the property that it allows portions of the font memory to be accessed in any desired order.

Attribute decoder 45 decodes the display and attribute data from the video data queue, and performs the corresponding 3270 coax attribute functions. The 3270 coax attribute include field, extended field, and character attributes.

The field attribute occupies one character position in the display buffer and is stored as a non-displayable character (actually displayed as a blank). Display related field attributes may specify intensified and non-displayable.

The extended field attribute is stored in the attribute buffer but is not displayed. It allows for blinking, reverse video, underscore, seven-color, and character font select. The character attribute is stored in the attribute buffer and controls the characteristics of each character on the screen. It allows for blinking, reverse video, underscore, seven-color, and character font select.

Display List Processor (DLP) Instruction Set

DLP 20 executes a small but powerful instruction set that provides considerable flexibility in creating characters on the display. As will be described in greater detail below, the DLP instructions provide for building a display structure on a scan line by scan line basis, with a do-loop type instruction provided to generate all the scanlines of a single character row. The vertical retrace pulse can be programmed to occur anywhere on the scanline for use with interlace, or quad-/tri-interlace modes if so desired.

The instruction set includes a set of video instructions and a set of control instructions. The video instructions include a DISPLAY STRING instruction, a REPEAT CHARACTER instruction, a WINDOW instruction, and a set of BLANK DISPLAY instructions. The control instructions include a LOAD instruction, a LOOP instruction, a SET CURSOR instruction, and a SET ROW COUNTER instruction. The video instruction formats are set forth in Tables 1A–D, and the control instruction formats are set forth in Table 1E.

Each video instruction includes one-bit fields for horizontal pulse (HP) and vertical pulse (VP). If the HP bit is set, the horizontal pulse will be generated. This provides the programmer total control over where the pulse starts on a scan line and where it ends, and thus allows the sync pulse to come any time during or before blanking. The VP bit provides the same flexibility. A number of the video instructions also contain a one-bit field specifying an interrupt to micro-engine 15. This allows the interrupt to be generated anywhere in the active video area, i.e., synchronized to a particular display point on the screen or at the start of blanking.

The DISPLAY STRING instruction allows a scan line to be built up in segments from various parts of memory. The instruction specifies a starting address for sequential display, namely, the address from which accesses have to start. This address is automatically incremented at the end of each memory read. It also specifies a length of string (less one), which is counted down to zero before the next display list instruction is executed, while displaying each character sequentially from the address indicated. The DISPLAY STRING instruction accesses the display buffer in system memory 12 for character code and attribute and the font memory 13 for the actual bit pattern as many times on every scanline as there are characters in a row. The instruction also specifies a status line indicator, which if set, causes the attribute data to be loaded from a fixed-status attribute register, and all display memory accesses yield character code data only.

The REPEAT CHARACTER instruction is used to generate the window border and overscan regions. The instruction specifies the character code and attribute, and the number of repetitions (less one) of the character. The instruction does not access system memory 12 and accesses font memory 13 only once per repeated character per scan line. (In a present version, the REPEAT CHARACTER instruction ignores the character code and only repeats the background color.)

The WINDOW instruction is executed at the start or end of a window scanline and creates the configuration necessary for the window, which may be totally different from the background display.

The four BLANK DISPLAY instructions are used to generate the blanking pulse for a specified number of character times during each scanline. In addition to specifying the length of the blanking pulse (in terms of character times), the instructions specify a 15-bit address of the next DLP instruction to be executed. The next DLP instruction address must be calculated during the blanking period, especially for those instructions that have to be synchronized to the display timing. The instructions include NOP (opcode=00), which performs no function other than those outlined above, and JUMP (opcode=01), LOOPBACK (opcode=10), and INCREMENT LOOP COUNTER (opcode=11) instructions, each of which performs another function in parallel.

The JUMP instruction specifies an end-of-screen jump to the start of the display list indicated by the next display list address field.

The LOOPBACK instruction specifies looping back to the next scan line of the present character box. During this time the loop counter is first incremented by a value determined by the F1 and F0 bits and then compared with the final value. If the counter value exceeds the final value, loopback is not performed, and the next consecutive display list instruction is executed. Otherwise, loopback occurs to the address specified in the address field. The loop increment is 1 for F(1:0)=00, 2 for F(1:0)=01, 3 for F(1:0)=10, and 4 for F(1:0)=11.

The INCREMENT instruction causes the loop counter to be incremented by an offset given by the value defined by the F0 and F1 bits, but performs no comparison or branch.

The control instructions do the flow control for the video instructions and the housekeeping chores for the display, such as cursor controls, color palettes, etc. There are two formats for these instructions, 32-bit and 16-bit. The 16-bit format is used for control operations they have a very high frequency of use.

The 32-bit LOAD instruction specifies the initialization of a designated destination register with 16-bit data. The seven possible destination registers are the attribute for the status line, the primary cursor coordinates, the print-box start coordinates, the print-box end coordinates, and three display configurations.

The 16-bit LOOP instruction (bit(12)=0, opcode=01) specifies a range of scan rows, and causes a loop on the succeeding instructions until a LOOPBACK instruction is encountered. The loop counter is started at the specified start value and finished when the loop counter exceeds the specified stop value.

The 16-bit SET CURSOR instruction (bit(12)=0, opcode=10) sets the cursor column or row register to the specified 8-bit value. One bit specifies whether the row register or the column register is to be set.

The 16-bit SET ROW instruction (bit(12)=1) loads the specified 5-bit value into the screen row register.

Display Control Logic Details

Figure 3A:
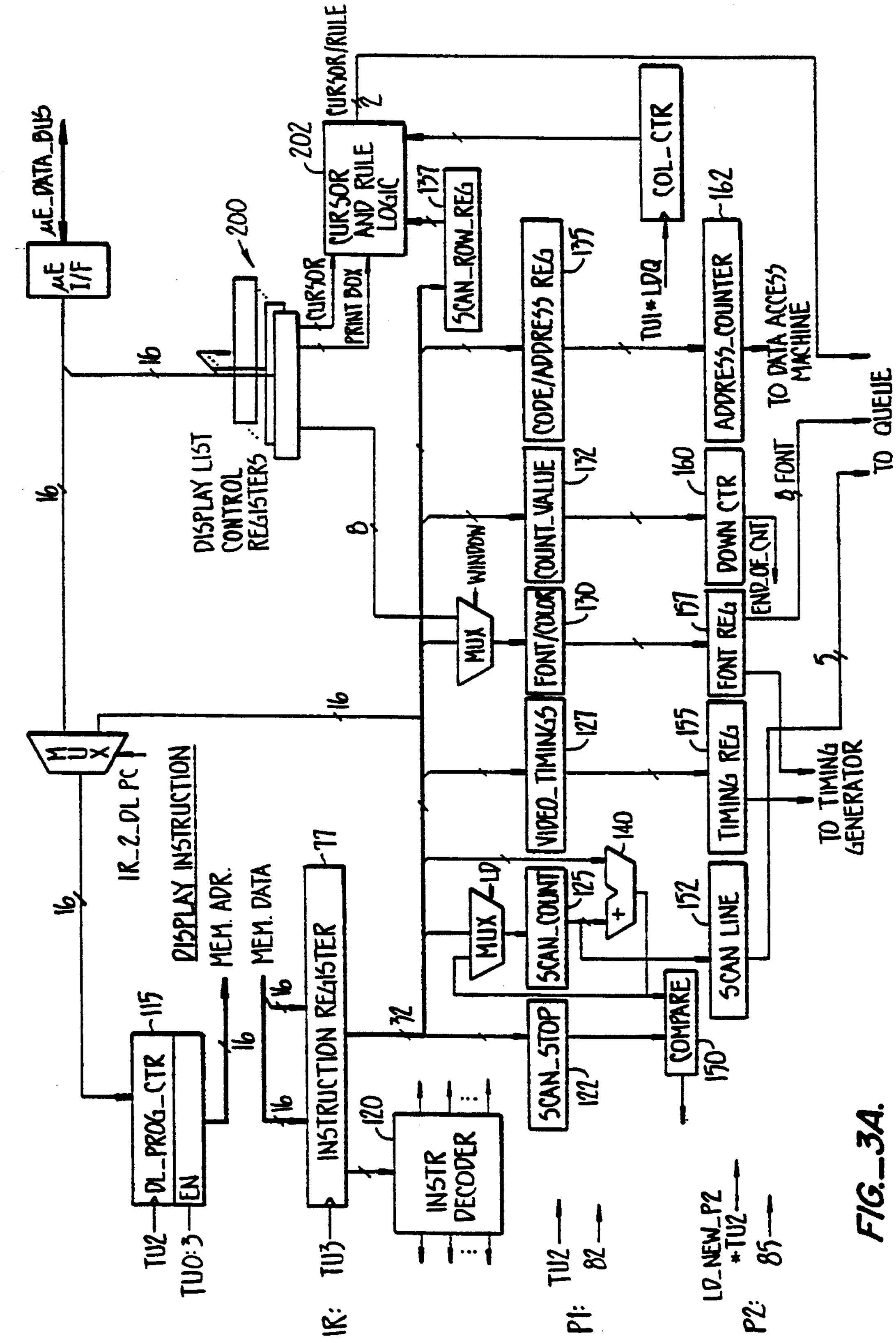
FIGS. 3A and 3B together provide a detailed block diagram of the display control logic.
Figure 3B:
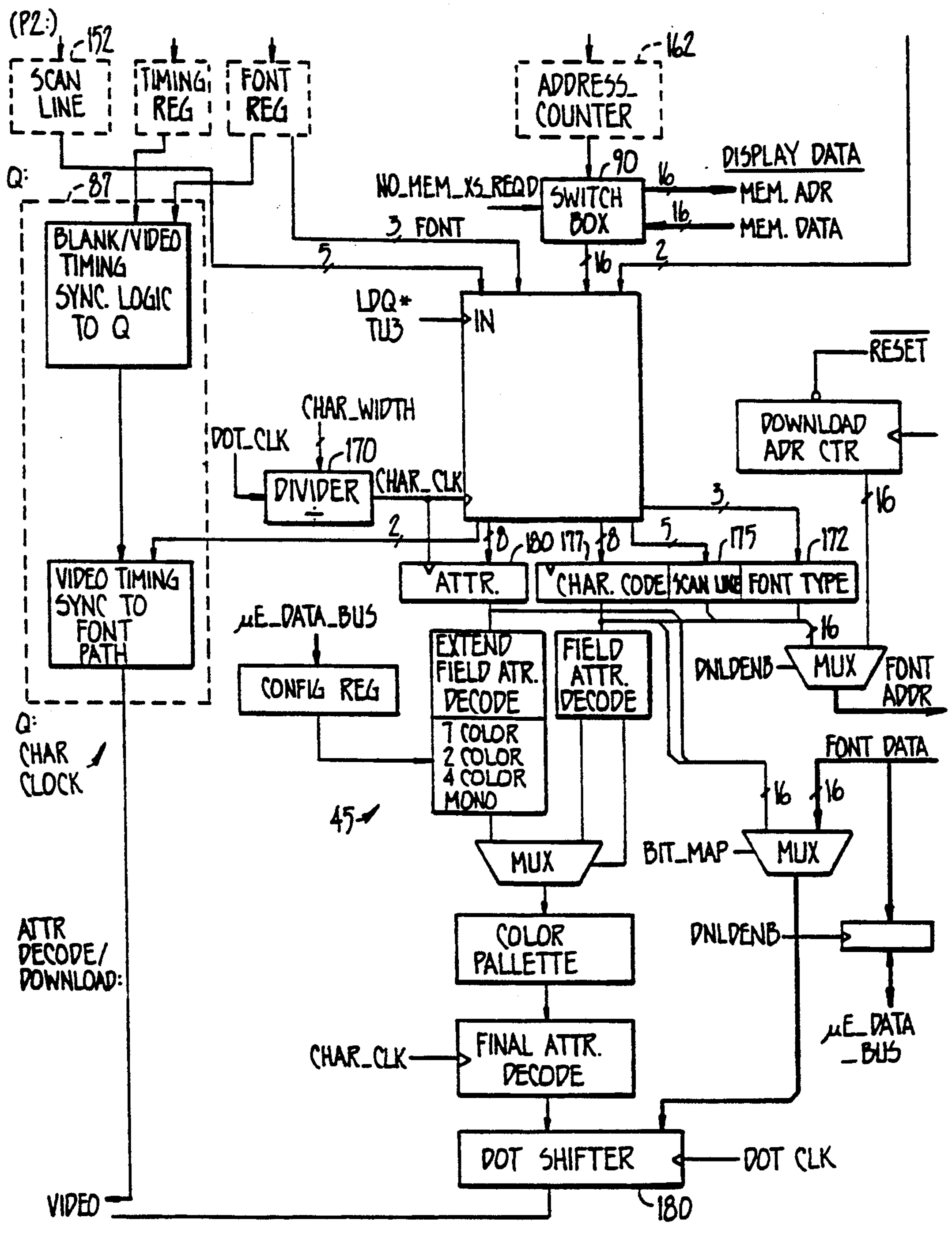

FIGS. 3A and 3B are detailed block diagrams of the display control logic illustrated in FIG. 2. FIG. 3A shows the various elements that define instruction sequencer 22, instruction register 77, portions of initial instruction processor 80, holding register set 82, and execution register/counter set 85. FIG. 3B shows the elements that define timing generator 87, data access machine 90, video data queue 95, attribute decoder 45, and video interface 47. Portions of execution register/counter set 85 are shown in phantom in FIG. 3B in order to facilitate correlation with FIG. 3A.

Figure 4A:
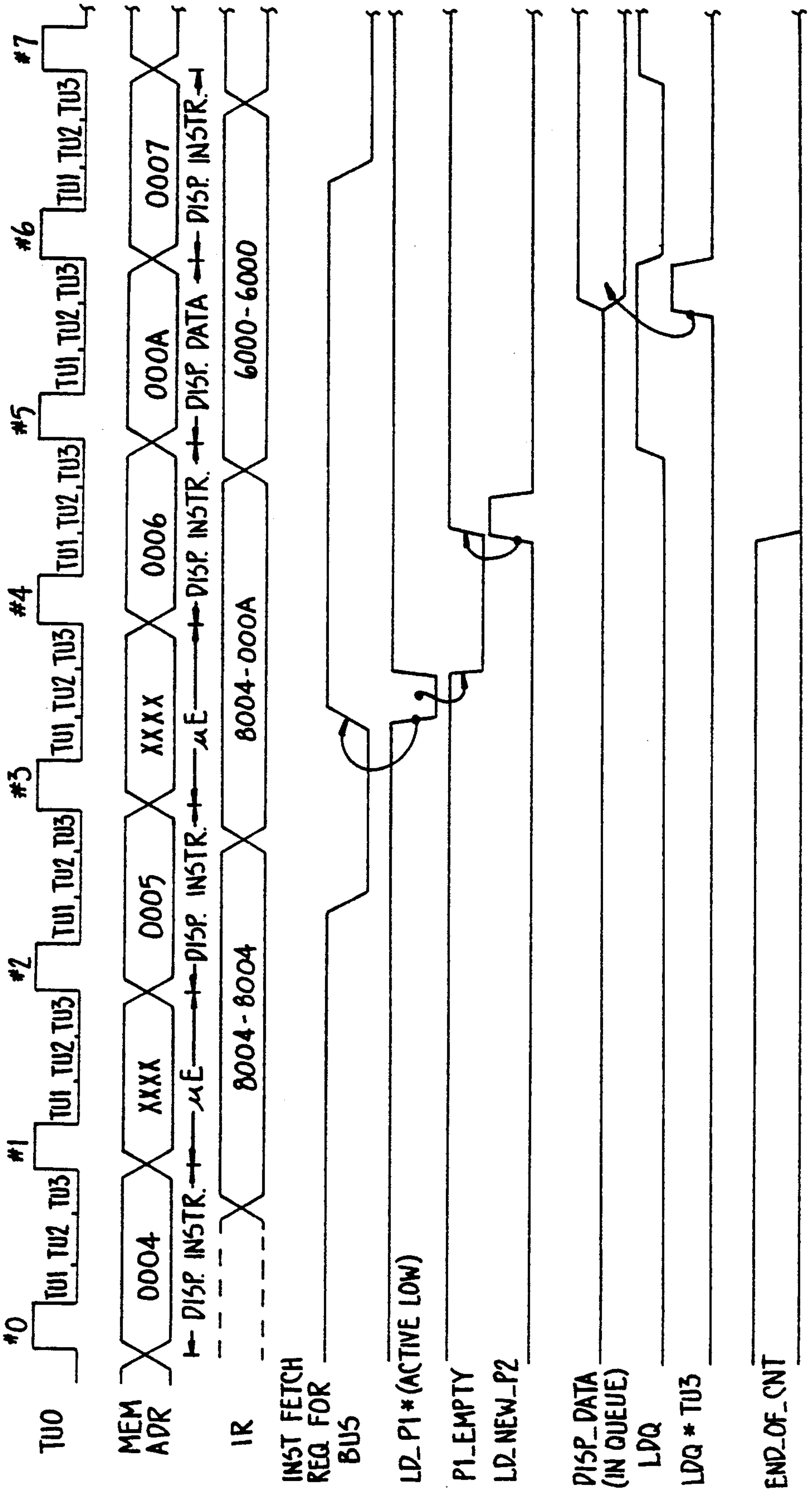
FIGS. 4A and 4B together provide a timing diagram illustrating display list processor instruction execution.
Figure 4B:
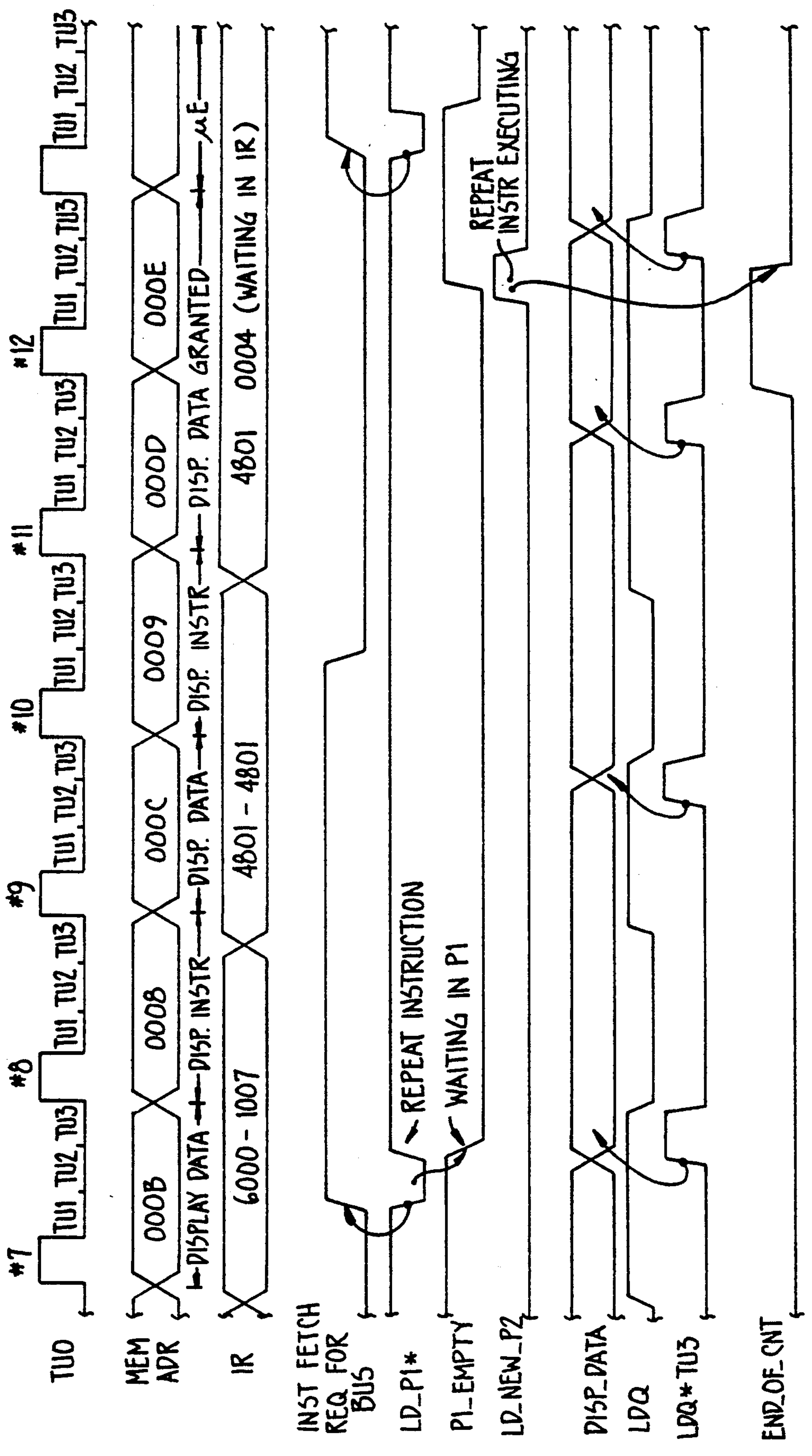

FIGS. 4A and 4B provide a timing diagram illustrating the execution of DLP instructions to the point where entries are loaded into video data queue 95. Two time bases are relevant to the operation of the display control logic. As noted above, DLP instructions and character codes and attributes must be fetched from system memory 12. Since access to the system memory is arbitrated with other devices in the system, most notably micro-engine 15, the portions of the display control logic that require memory accesses are based on timing established by memory cycles. A memory cycle is divided into time units designated TU0, TU1, TU2, and TU3. The data are then loaded into video data queue 95 based on this timing. A different time base is used for reading data out of the video data queue and transforming it to a video signal. Timing for these operations is determined by a dot clock synchronized to the display and a character clock based on the dot clock.

A program counter 115 specifies an address in system memory from which a DLP instruction is fetched and loaded into instruction register (IR) 77, which is clocked by the trailing edge of TU3. Decoding occurs immediately at an instruction decoder 120, and control instructions are executed (as will be discussed more fully below). Holding register set 82 includes a set of registers, different subsets of which are loaded depending on the instruction, as defined by instruction decoder 120. These include a Scan Stop register 122, a Scan Count register 125, a Video Timing register 127, a Font/Color register 130, a Count Value register 132, a Code/Address register 135, and a Scan Row register 137. Additionally, a portion of the instruction may be loaded into one side of an adder 140 associated with Scan Count register 125.

The contents of holding register set 82 are passed on, for the most part, to corresponding elements in execution register/counter set 85. Specifically, the content of Scan Stop register 122 and the output from adder 140 are communicated to a comparator 150; the content of Scan Count register 125 is communicated to the other side of adder 125 and to a Scan Line register 152; the contents of Video Timing register 127 and Font/Color register 130 are communicated to respective corresponding registers 155 and 157; the content of Count Value register 132 is loaded into a down counter 160; and the content of Code/Address register 135 is loaded into an address counter 162.

Scan Count register 125 is initially loaded from instruction register 77 to set up a loop, but is subsequently updated from the output of adder 140 during iterations within the loop.

As alluded to above, the display control logic includes a set of seven 16-bit registers 200. These can be loaded by the LOAD instruction (one of the control instructions) and are used to provide information for cursor and rule logic 202 and alternate data for font/color register 130.

Registers 200 and program counter 115 can also be loaded or modified directly by micro-engine 15 via a micro-engine interface 205. The interface includes three internal 8-bit I/O ports, one of which is used as a control register and the other two of which are used to form a 16-bit I/O data port. The control register includes a Write Enable bit, a Display List Access bit, a complementary Reset bit, and a 4-bit field designating a particular one of registers 200 (or program counter 115). At power up, all the bits are cleared so that the DLP will start up in the reset state, and until the micro-engine writes a 1 in the complementary Reset bit, the DLP will remain in the reset state. This allows the micro-engine to selectively turn the DLP (and hence the display) on or off.

Display List Processor Operation

The operation of the DLP may be explained with reference to the execution of a specific instruction sequence to display a line of characters on the screen. Assume that it is desired to display the first row of the display with 80 characters whose codes are stored in contiguous locations in the system memory starting at address Start1. For illustrative purposes, a simplified assembler language will be used. Numbers are in decimal, and counts are assumed to go from 1 to N as opposed rather than 0 to (N−1).

A representative sequence of instructions, written in the simplified assembler language, would be as follows:

SET ROW 1
LOOP 1, 16
LOOP1:
DISPLAY STRING Start1, 80
NOP 3
NOP 6, HP
LOOPBACK 5, LOOP1

The above sequence consists of:

(1) a SET ROW instruction to specify the first row on the display; (2) a LOOP instruction to set up a loop for 16 scan lines; (3) a DISPLAY STRING instruction within the loop to generate one scan line of display characters for each pass through the loop; (4) two NOP instructions within the loop to display blanks and set up the horizontal pulse for each pass through the loop; and (5) a LOOPBACK instruction to close the loop.

The execution of this instruction sequence will now be described with specific reference to the DLP elements described in connection with FIGS. 3A–B.

The SET ROW instruction is a 16-bit control causes the row number to be set to the value specified. This instruction causes the specified value (in this case 1) to be loaded into Scan Row register 137.

The LOOP instruction is a 16-bit control instruction specifying the scan lines to be processed within the loop. This instruction causes the starting scan line (0) to be loaded into Scan Count register 125 and the ending scan line (15) to be loaded into Scan Stop register 122.

The DISPLAY STRING instruction specifies the starting address and length of a string of characters to be displayed as part or all of a row on the display. This instruction initiates a request for memory and causes the length of the character string (80) to be loaded into Count Value register 132 and the starting address (Start1) to be loaded into Code/Address register 135.

These values are then loaded into down counter 160 and address counter 162 when the counters are available. This will be the case, for example, at startup or when a previous instruction has finished execution. The address stored in address counter 162 is applied to the system memory, and the character code and attribute are retrieved. Upon successful completion of the memory read, the down counter is decremented and the address counter is incremented. At this time, the character code and attribute from memory, along with the content of Scan Line register 152 and the font code from Font/Color register 130 are loaded into video queue 95. This sequence continues until down counter 160 reaches zero, which signifies the correct number of characters on the scan line have been entered into the queue. At this point, the next instruction is executed. This is a NOP instruction whose effect is to generate a specified number of blanks. The specified number of blanks is loaded into Count Value register 132 and the character code and attribute for a blank are loaded into Code/Address register 135. These are transferred to down counter 160 and address counter 162. Down counter 160 is decremented while address counter 162 is allowed to act as a simple register. The content of address counter 162 is passed directly through data access machine 90 without accessing memory. The appropriate number of queue entries are made, at which point the next instruction is executed.

The next instruction is also an NOP, which generates a number of blanks, but has the horizontal pulse bit set. This is passed through timing registers 127 and 155 to the timing logic to end the scan line.

The next instruction is a LOOPBACK instruction, which generates a number of blanks and increments the loop counter stored in Scan Count register 125. If the value stored in Scan Count register 125 has not exceeded the value stored in Scan Stop register 122, the address field in the LOOPBACK instruction is loaded into program counter 115. This causes another pass through the loop to allow the next scan line to be processed. The entire process (execution of DISPLAY STRING and NOP instructions) is repeated 15 times until the value stored in Scan Count register 125 has reached the value stored in Scan Stop register 122.

As these instructions are being executed, and the character codes and attributes are being loaded into the top of the queue, previous entries are read out at the bottom of the queue at a rate determined by the character clock. The character clock is a signal having a frequency that is a sub-multiple of the dot clock frequency, as determined by a divider 170.

The queue entries are then read out into font type, scan line, character code, and attribute registers 172, 175, 177, and 180. For each entry read out of the queue, the font type, character code, and scan line, in that order, are used to define an address to font/code memory 13, and the data returned from that memory is applied to a dot shifter 190. Dot shifter 190 is clocked by the dot clock, and provides the actual bit stream(s) that define(s) the modulation of the video signal. The character code and attribute stored in registers 177 and 180 are applied to attribute decoding circuitry 45.

Thus, it can be seen how the SET ROW, LOOP, DISPLAY STRING, NOP, and LOOPBACK instructions operate to allow building a row of characters, character slice by character slice within a given scan line, and scan line by scan line to make up the full row of characters. The operation of the DLP to execute the other instructions is summarized below.

The REPEAT character instruction causes the specified number of repetitions (less 1) to be loaded into Count Value register 132 and the specified character code and attribute to be loaded into Code/Address register 135. The character code and attribute are then passed to address counter 162, and made directly available to the queue since no memory access is required.

The JUMP instruction (one of the BLANK DISPLAY instructions) causes the specified next DLP instruction address to be loaded into program counter 115. It is noted that the NOP instructions do not affect the program counter. The INCREMENT LOOP COUNTER instruction performs like the LOOPBACK instruction but does not cause a branch.

The WINDOW instruction causes the specified window border character code and attribute to be loaded into Code/Address register 135 and the font select field to be loaded into Font/Color register 130. This is set up only, since the actual window coordinates are defined by the program.

Display List Processor Timing

The timing diagram shown in FIGS. 4A and 4B illustrates the execution of a number of DLP instructions stored in memory locations starting at 0004. The cycles are numbered from #0, and a particular access to memory occurs as a result of arbitration. In the particular implementation, the two 16-bit words of a 32-bit instruction are fetched from adjacent locations in separate memory cycles. The high word is written into both halves of IR 77 and the low word is then written into the lower half of the IR. In the specific example, the contents of the memory locations starting at 0004 are as follows:

| Memory Location (Hex) | Content (Hex) |
|---|---|
| 0004 | 8004 |
| 0005 | 000A |
| 0006 | 6000 |
| 0007 | 1007 |
| 0008 | 4801 |
| 0009 | 0004 |

Locations 0004 and 0005 contain a DISPLAY STRING instruction specifying five characters starting at location 000A. Locations 0006 and 0007 contain a REPEAT instruction with a specified character. Locations 0008 and 0009 contain a JUMP to location 0004 with a two-character video blanking period.

During Cycle #10 (granted for a display instruction fetch) 0004 appears on the display address bus and the memory content (8004) is written into both halves of IR 77. P1 (holding register set 82) and P2 (execution register/counter set 85) are empty.

Cycle #1 is granted to the micro-engine.

During Cycle #2 (display instruction fetch) 0005 appears on the display address bus and the memory content (000A) is written into the lower half of IR 77.

During Cycle #3 (granted to the micro-engine) the content of the IR (DISPLAY STRING instruction) is loaded into P1.

During Cycle #4 (display instruction fetch) 0006 appears on the display address bus, the memory content (6000) is loaded into both halves of IR 77, and relevant portions of P1 are loaded into P2.

During Cycle #5 (granted for a display data fetch) the DISPLAY STRING instruction commences execution. 000A (the starting address specified in the DISPLAY STRING instruction) appears on the display address bus, and the fetched data from 000A (and the relevant portions of P2) are loaded into video queue 95.

During Cycle #6 (display instruction fetch) 0007 appears on the display address bus and the memory content (1007) is written into the lower half of IR 77.

During Cycle #7 (display data fetch) 000B appears on the display address bus, the content of IR 77 (REPEAT instruction) is loaded into P1, and the fetched data from 000B is loaded into the video queue.

The IR is loaded with the JUMP instruction during Cycles #8 and #10, separated by a data access from location 000C during cycle #9. At this point, however, the instruction pipeline is full, so the DLP will not make requests for display instruction fetches from memory. Cycles #11 and #12 are granted for display data fetches from locations 000D and 000E and corresponding queue entries are made. Once location 000E has been accessed, down counter 160 signifies the end of the count for the DISPLAY STRING instruction. The REPEAT instruction, which was waiting in P1, can now be loaded into P2 for execution, and the JUMP instruction in the IR is loaded into P1. At this point, a new instruction fetch cycle may be requested.

Random Display of Character Memory

The DISPLAY STRING instruction provides flexibility and efficiency in displaying rows of characters. More specifically, a row of characters on the display can be built up piecemeal from different parts of memory by programming a sequence of DISPLAY STRING instructions, each specifying the starting address of a portion of the line, and the number of characters in that portion. A significant use of this versatility is for placing windows on the display without requiring data transfers between memory locations.

A representative sequence of simplified assembler language instructions for setting up the ninth and tenth rows including the top border and first row of the window is as follows:

```
SET ROW 9
LOOP 1, 16
  LOOP9:
DISPLAY STRING Start9, 20
WINDOW (Left Corner Char), Attr
REPEAT (Border Char), Attr, 39
WINDOW (Right Corner Char), Attr
DISPLAY STRING (Start9+61), 19
NOP 3
NOP 6, HP
LOOPBACK 5, LOOP9
SET ROW 10
LOOP 1, 16
  LOOP10:
DISPLAY STRING Start10, 20
WINDOW (Border Char), Attr
DISPLAY STRING Startwin, 39
WINDOW (Border Char), Attr
DISPLAY STRING (Start10+61), 19
NOP 3
NOP 6, HP
LOOPBACK 5, LOOP10
```

In this sequence the starting address Start10 for row 10 is equal to Start9+80 since it is assumed that the background screen characters are stored in contiguous locations. Similarly, subsequent rows of the window will have starting addresses incremented by the window width (assuming the window characters are stored in contiguous locations).

Discussion of the Software

Appendix 1 (Copyright © 1990, Unpublished Work, Chips and Technologies, Inc.) provides a source code listing of DLP instructions for generating the display data for a 24×80 display without interlace. The loop increment is 1 (F(1:0)=00).

Appendix 2 (Copyright © 1990, Unpublished Work, Chips and Technologies, Inc.) provides a source code listing of DLP instructions for generating the display data for a 24×80 display with interlace. The loop increment is 2 (F(1:0)=01).

In the specific examples, an extra non-display control character is read out at the beginning of each scan line. Additionally, the window borders are drawn using the DISPLAY STRING instruction rather than the REPEAT CHARACTER instruction.

CONCLUSION

While the above is a complete description of the preferred embodiments of the invention, various alternatives, modifications, and equivalents may be used. Therefore, the above description should not be taken as

BEST AVAILABLE COPY limiting the scope of the invention which is defined by the appended claims.

TABLE 1A

DISPLAY STRING INSTRUCTION FORMATS

| Bit(s) | Field/Value |
|---|---|
| 31..30 | 10 |
| 29 | Reserved |
| 28 | Status Line Indicator |
| 27 | Interrupt to Micro-Engine |
| 26 | Reserved |
| 25 | Horizontal Pulse |
| 24 | Vertical Pulse |
| 23..16 | Length - 1 |
| 15 | 0 |
| 14..0 | Starting Address |

TABLE 1B

REPEAT CHARACTER INSTRUCTION FORMAT

| Bit(s) | Field/Value |
|---|---|
| 31..29 | 011 |
| 27 | Interrupt to Micro-Engine |
| 26 | 0 |
| 25 | Horizontal Pulse |
| 24 | Vertical Pulse |
| 23..16 | No. to Repeat - 1 |
| 15..8 | Character Code |
| 7..0 | Character Attribute |

TABLE 1C

WINDOW INSTRUCTION FORMAT

| Bit(s) | Field/Value |
|---|---|
| 31..30 | 11 |
| 29..28 | Reserved |
| 27..26 | Language Font Select |
| 25 | Horizontal Pulse |
| 24 | Vertical Pulse |
| 23 | Horizontal Rule Enable |
| 22 | Vertical Rule Enable |
| 21..20 | Reserved |
| 15..8 | Window Border Character |
| 7..0 | Window Border Attribute |

TABLE 1D

BLANK DISPLAY INSTRUCTION FORMAT

| Bit(s) | Field/Value |
|---|---|
| 31..29 | 100 |
| 28 | Interrupt to Micro-Engine |
| 27..26 | Opcode |
| 25 | Horizontal Pulse |
| 24 | Vertical Pulse |
| 23 | F1 |
| 22..16 | Width - 1 |
| 15 | F0 |
| 14..0 | Next DLP Instruction Address |
| Opcodes | |
| 00 | No Op |
| 01 | Jump |
| 10 | Loopback |
| 11 | Increment Loop Counter |

TABLE 1E

CONTROL INSTRUCTION FORMATS

LOAD

| Bit(s) | Field/Value |
|---|---|
| 31..29 | 000 |
| 28 | 0 |
| 27..26 | Opcode = 00 |
| 25..20 | Reserved |
| 19..16 | Destination Register |
| 15..0 | 16-bit Data |

LOOP

| Bit(s) | Field/Value (hex) |
|---|---|
| 15..13 | 001 |
| 12 | 0 |
| 11..10 | Opcode = 01 |
| 9..5 | Starting Scan Line |
| 4..0 | Ending Scan Line |

SET CURSOR

| Bit(s) | Field/Value (hex) |
|---|---|
| 12 | 0 |
| 11..10 | Opcode = 10 |
| 9 | 0 |
| 8 | Row if 1, Column if 0 |
| 7..0 | Cursor Row/Col Value |

SET ROW COUNTER

| Bit(s) | Field/Value (hex) |
|---|---|
| 12 | 1 |
| 9 | 1 |
| 4..0 | Row Counter |

Appendix 1

```
line adr code    input
                 #DEFINE ROW_MAX        81
                 #DEFINE NOT_SEE1       3
                 #DEFINE NOT_SEE2       6
                 #DEFINE NOT_SEE3       5

                 ;**************************************************************
                 ;*                                                            *
                 ;*   THIS IS DISPLAY LIST INSTRUCTION SET TO GENERATE THE DISPLAY *
                 ;*   LIST DATA FOR SLOW SCREEN (24X80).  THE SCREEN FORMAT IS AS  *
                 ;*   FOLLOWING:                                               *
                 ;*         ----------------------------------------           *
                 ;*         *     ----- 80 -----          * 3 * 6 * 6 *        *
                 ;*         * *                           *   *   *   *        *
                 ;*         * *              ---------    *   * H *   *        *
                 ;*         * *              *W       *   *   * S *   *        *
                 ;*         * 24             * I      *   *   * Y *   *        *
                 ;*         * *              *  N     *   *   * N *   *        *
                 ;*         * *              *   D    *   *   * C *   *        *
                 ;*         * *              *    O   *   *   *   *   *        *
                 ;*         *                *     W  *   *   *   *   *        *
                 ;*         *                 ---------   *   *   *   *        *
                 ;*         *                             *   *   *   *        *
                 ;*         *                             *   *   *   *        *
                 ;*         *-----------------------------*---*---*---*        *
                 ;*         *       2 SCAN LINES ( DELIMITER )        *        *
                 ;*         ------------------------------*---*---*---*        *
```

```
line adr code         input                              ; ELSE GOTO NEXT INSTRUCTION
                       ;*          *       16 SCAN LINES ( STATUS LINE )     *        *
                       ;*          ---------------------------------*---*---*---*        *
                       ;*          *        8 SCAN LINES                     *        *
                       ;*          ---------------------------------*---*---*---*        *
                       ;*          *       16 SCAN LINES   VSYNC             *        *
                       ;*          ---------------------------------*---*---*---*        *
                       ;*          *       16 SCAN LINES                     *        *
                       ;*          ------------------------------------------        *
                       ;*                                                            *
                       ;*                                                            *
                       ;**************************************************************
                       ;
     4200                      ORG       0X4200
                       ;
                       ;       1ST LINE DISPLAY, STARTING ADDR IN 1850H
                       ;
                       WIN_START:
     4200 3001                 ROW       0X01              ; ROW NUMBER
     4201 240F                 LOOP      0X00,0X0F         ; SETUP 16 SCAN LINES
                       LOOP1:
     4202 8050184F             DISPLAY 0X184F,ROW_MAX        ; DISPLAY 80 CHAR, START FROM ADDR 1850
     4204 40020000             NOP       NOT_SEE1          ; DISPLAY BLANK CHAR
     4206 42050000             NOP       NOT_SEE2,HP       ; DISPLAY BLANK W/ HSYNC
     4208 48044202             LOOPBACK          NOT_SEE3,0X00,LOOP1      ; DISPLAY BLANK, INC LPCTR,
                                                           ; IF LPCTR < STOP ROW, LPBACK

                       ;
                       ;       2ND LINE DISPLAY, STARTING ADDR IN 18A0H
                       ;
     420A 3002                 ROW       0X02              ; LOAD ROW CNT TO SCN ROW REG
     420B 240F                 LOOP      0X00,0X0F         ; SETUP 16 SCAN LINES
                       LOOP2:
     420C 8050189F             DISPLAY 0X189F,ROW_MAX        ; DISPLAY 80 CHAR, START FROM ADDR 18A0
     420E 40020000             NOP       NOT_SEE1          ; DISPLAY BLANK CHAR
     4210 42050000             NOP       NOT_SEE2,HP       ; DISPLAY BLANK W/ HSYNC
     4212 4804420C             LOOPBACK          NOT_SEE3,0X00,LOOP2      ; DISPLAY BLANK, INC LPCTR,
                                                           ; IF LPCTR < STOP ROW, LPBACK
                                                           ; ELSE GOTO NEXT INSTRUCTION
                       ;
                       ;       3RD LINE DISPLAY, STARTING ADDR IN 18F0H
                       ;
     4214 3003                 ROW       0X03              ; LOAD ROW COUNT TO SCN ROW REG
     4215 240F                 LOOP      0X00,0X0F         ; SETUP 16 SCAN LINES
                       LOOP3:
     4216 805018EF             DISPLAY 0X18EF,ROW_MAX        ; DISPLAY 80 CHAR, START FROM ADDR 18A0
     4218 40020000             NOP       NOT_SEE1          ; DISPLAY BLANK CHAR
     421A 42050000             NOP       NOT_SEE2,HP       ; DISPLAY BLANK W/ HSYNC
     421C 48044216             LOOPBACK          NOT_SEE3,0X00,LOOP3      ; DISPLAY BLANK, INC LPCTR,
                                                           ; IF LPCTR < STOP ROW, LPBACK
                                                           ; ELSE GOTO NEXT INSTRUCTION
                       ;
                       ;       4TH LINE DISPLAY, STARTING ADDR IN 1940H
                       ;
                       ;
     421E 3004                 ROW       0X04              ; LOAD ROW COUNT TO SCN ROW REG
     421F 240F                 LOOP      0X00,0X0F         ; SETUP 16 SCAN LINES
                       LOOP4:
     4220 8050193F             DISPLAY 0X193F,ROW_MAX        ; DISPLAY 80 CHAR, START FROM ADDR 1940
     4222 40020000             NOP       NOT_SEE1          ; DISPLAY BLANK CHAR
     4224 42050000             NOP       NOT_SEE2,HP       ; DISPLAY BLANK W/ HSYNC
     4226 48044220             LOOPBACK          NOT_SEE3,0X00,LOOP4      ; DISPLAY BLANK, INC LPCTR,
                                                           ; IF LPCTR < STOP ROW, LPBACK
                                                           ; ELSE GOTO NEXT INSTRUCTION

                       ;       5TH LINE DISPLAY, STARTING ADDR IN 1990H
                       ;
                       ;
     4228 3005                 ROW       0X05              ; LOAD ROW COUNT TO SCN ROW REG
     4229 240F                 LOOP      0X00,0X0F         ; SETUP 16 SCAN LINES
                       LOOP5:
     422A 8050198F             DISPLAY 0X198F,ROW_MAX        ; DISPLAY 80 CHAR, START FROM ADDR 1990
     422C 40020000             NOP       NOT_SEE1          ; DISPLAY BLANK CHAR
     422E 42050000             NOP       NOT_SEE2,HP       ; DISPLAY BLANK W/ HSYNC
     4230 4804422A             LOOPBACK          NOT_SEE3,0X00,LOOP5      ; DISPLAY BLANK, INC LPCTR,
                                                           ; IF LPCTR < STOP ROW, LPBACK
                                                           ; ELSE GOTO NEXT INSTRUCTION

                       ;       6TH LINE DISPLAY, STARTING ADDR IN 19E0H
                       ;
                       ;
     4232 3006                 ROW       0X06              ; LOAD ROW COUNT TO SCN ROW REG
     4233 240F                 LOOP      0X00,0X0F         ; SETUP 16 SCAN LINES
                       LOOP6:
     4234 805019DF             DISPLAY 0X19DF,ROW_MAX        ; DISPLAY 80 CHAR, START FROM ADDR 19E0
     4236 40020000             NOP       NOT_SEE1          ; DISPLAY BLANK CHAR
     4238 42050000             NOP       NOT_SEE2,HP       ; DISPLAY BLANK W/ HSYNC
     423A 48044234             LOOPBACK          NOT_SEE3,0X00,LOOP6      ; DISPLAY BLANK, INC LPCTR,
                                                           ; IF LPCTR < STOP ROW, LPBACK
                                                           ; ELSE GOTO NEXT INSTRUCTION

                       ;       7TH LINE DISPLAY, STARTING ADDR IN 1A30H
                       ;
                       ;
```

```
line adr code        input
     423C 3007                   ROW      0X07               ; LOAD ROW COUNT TO SCN ROW REG
     423D 240F                   LOOP     0X00,0X0F          ; SETUP 16 SCAN LINES
                          LOOP7:
     423E 80501A2F               DISPLAY 0X1A2F,ROW_MAX        ; DISPLAY 80 CHAR, START FROM ADDR 1A30
     4240 40020000               NOP      NOT_SEE1           ; DISPLAY BLANK CHAR
     4242 42050000               NOP      NOT_SEE2,HP        ; DISPLAY BLANK W/ HSYNC
     4244 4804423E               LOOPBACK        NOT_SEE3,0X00,LOOP7      ; DISPLAY BLANK, INC LPCTR,
                                                             ; IF LPCTR < STOP ROW, LPBACK
                                                             ; ELSE GOTO NEXT INSTRUCTION

                          ;      8TH LINE DISPLAY, STARTING ADDR IN 1A80H
                          ;
                          ;
     4246 3008                   ROW      0X08               ; LOAD ROW COUNT TO SCN ROW REG
     4247 240F                   LOOP     0X00,0X0F          ; SETUP 16 SCAN LINES
                          LOOP8:
     4248 80501A7F               DISPLAY 0X1A7F,ROW_MAX        ; DISPLAY 80 CHAR, START FROM ADDR 1A80
     424A 40020000               NOP      NOT_SEE1           ; DISPLAY BLANK CHAR
     424C 42050000               NOP      NOT_SEE2,HP        ; DISPLAY BLANK W/ HSYNC
     424E 48044248               LOOPBACK        NOT_SEE3,0X00,LOOP8      ; DISPLAY BLANK, INC LPCTR,
                                                             ; IF LPCTR < STOP ROW, LPBACK
                                                             ; ELSE GOTO NEXT INSTRUCTION

                          ;      9TH LINE DISPLAY, WINDOW BORDER
                          ;
     4250 3009                   ROW      0X09               ; LOAD ROW COUNT TO SCN ROW REG
     4251 240F                   LOOP     0X00,0X0F          ; SETUP 16 SCAN LINES
                          LOOP9:
     4252 80141ACF               DISPLAY 0X1ACF,0X15         ; DISPLAY 20 CHAR, START FROM ADDR 1AD0
     4254 C0008CA1               WINDOW   0X8C,0XA1,0X00     ; WINDOW INSTRUCTION W/
                                                             ; LEFT CORNER CHAR, GREEN, REVERSE, & APL FONT
     4256 802631BA               DISPLAY 0X31BA,0X27         ; DISPLAY 39 TIMES FOR BORDER CHAR
                                                             ; BORDER CHAR W/ GREEN, REVERSE & APL FONT
     4258 C0009CA1               WINDOW   0X9C,0XA1,0X00     ; WINDOW INSTRUCTION W/

line adr code        input

                                                             ; RIGHT CORNER CHAR, GREEN, REVERSE & APL FONT
     425A 80121B0D               DISPLAY 0X1B0D,0X13         ; DISPLAY 19 CHAR, START FROM ADDR 1B0D
     425C 40020000               NOP      NOT_SEE1           ; DISPLAY BLANK CHAR
     425E 42050000               NOP      NOT_SEE2,HP        ; DISPLAY BLANK W/ HSYNC
     4260 48044252               LOOPBACK        NOT_SEE3,0X00,LOOP9      ; DISPLAY BLANK, INC LPCTR,
                                                             ; IF LPCTR < STOP ROW, LPBACK
                                                             ; ELSE GOTO NEXT INSTRUCTION
                          ;
                          ;      10TH LINE DISPLAY, WINDOW 1ST LINE
                          ;
     4262 300A                   ROW      0X0A               ; LOAD ROW COUNT TO SCN ROW REG
     4263 240F                   LOOP     0X00,0X0F          ; SETUP 16 SCAN LINES
                          LOOP10:
     4264 80141B1F               DISPLAY 0X1B1F,0X15         ; DISPLAY 20 CHAR, START FROM ADDR 1B20
     4266 C00084A1               WINDOW   0XB4,0XA1,0X00     ; WINDOW INSTRUCTION W/
                                                             ; BORDER CHAR, GREEN, REVERSE & APL FONT
     4268 80263000               DISPLAY 0X3000,0X27         ; DISPLAY 39 WINDOW CHAR, START FROM ADDR 3000
     426A C000B4A1               WINDOW   0XB4,0XA1,0X00     ; WINDOW INSTRUCTION W/
                                                             ; BORDER CHAR, GREEN, REVERSE & APL FONT
     426C 80121B5D               DISPLAY 0X1B5D,0X13         ; DISPLAY 19 CHAR, START FROM ADDR 1B5D
     426E 40020000               NOP      NOT_SEE1           ; DISPLAY BLANK CHAR
     4270 42050000               NOP      NOT_SEE2,HP        ; DISPLAY BLANK W/ HSYNC
     4272 48044264               LOOPBACK        NOT_SEE3,0X00,LOOP10     ; DISPLAY BLANK, INC LPCTR,
                                                             ; IF LPCTR < STOP ROW, LPBACK
                                                             ; ELSE GOTO NEXT INSTRUCTION
                          ;
                          ;      11TH LINE DISPLAY, WINDOW 2ND LINE
                          ;
     4274 300B                   ROW      0X0B               ; LOAD ROW COUNT TO SCN ROW REG
     4275 240F                   LOOP     0X00,0X0F          ; SETUP 16 SCAN LINES
                          LOOP11:
     4276 80141B6F               DISPLAY 0X1B6F,0X15         ; DISPLAY 20 CHAR, START FROM ADDR 1B70
     4278 C000B4A1               WINDOW   0XB4,0XA1,0X00     ; WINDOW INSTRUCTION W/
                                                             ; BORDER CHAR, GREEN, REVERSE & APL FONT
     427A 80263028               DISPLAY 0X3028,0X27         ; DISPLAY 39 WINDOW CHAR, START FROM ADDR 3028
     427C C000B4A1               WINDOW   0XB4,0XA1,0X00     ; WINDOW INSTRUCTION W/
                                                             ; BORDER CHAR, GREEN, REVERSE & APL FONT
     427E 80121BAD               DISPLAY 0X1BAD,0X13         ; DISPLAY 19 CHAR, START FROM ADDR 1BAD
     4280 40020000               NOP      NOT_SEE1           ; DISPLAY BLANK CHAR
     4282 42050000               NOP      NOT_SEE2,HP        ; DISPLAY BLANK W/ HSYNC
     4284 48044276               LOOPBACK        NOT_SEE3,0X00,LOOP11     ; DISPLAY BLANK, INC LPCTR,
                                                             ; IF LPCTR < STOP ROW, LPBACK
                                                             ; ELSE GOTO NEXT INSTRUCTION
                          ;
                          ;      12TH LINE DISPLAY, WINDOW 3RD LINE
                          ;
     4286 300C                   ROW      0X0C               ; LOAD ROW COUNT TO SCN ROW REG
     4287 240F                   LOOP     0X00,0X0F          ; SETUP 16 SCAN LINES
                          LOOP12:
     4288 80141BBF               DISPLAY 0X1BBF,0X15         ; DISPLAY 20 CHAR, START FROM ADDR 1BC0
     428A C000B4A1               WINDOW   0XB4,0XA1,0X00     ; WINDOW INSTRUCTION W/
*
line adr code        input
                                                             ; BORDER CHAR, GREEN, REVERSE & APL FONT
```

BEST AVAILABLE COPY

```
    428C 80263050          DISPLAY 0X3050,0X27     ; DISPLAY 39 WINDOW CHAR, START FROM ADDR 3050
    428E C000B4A1          WINDOW  0XB4,0XA1,0X00  ; WINDOW INSTRUCTION W/
                                                   ; BORDER CHAR, GREEN, REVERSE & APL FONT
    4290 80121BFD          DISPLAY 0X1BFD,0X13     ; DISPLAY 19 CHAR, START FROM ADDR 1BFD
    4292 40020000          NOP     NOT_SEE1        ; DISPLAY BLANK CHAR
    4294 42050000          NOP     NOT_SEE2,HP     ; DISPLAY BLANK W/ HSYNC
    4296 48044288          LOOPBACK        NOT_SEE3,0X00,LOOP12     ; DISPLAY BLANK, INC LPCTR,
                                                   ; IF LPCTR < STOP ROW, LPBACK
                                                   ; ELSE GOTO NEXT INSTRUCTION
                     ;
                     ;       13TH LINE DISPLAY, WINDOW 4TH LINE
                     ;
    4298 300D              ROW     0X0D            ; LOAD ROW COUNT TO SCN ROW REG
    4299 240F              LOOP    0X00,0X0F       ; SETUP 16 SCAN LINES
                     LOOP13:
    429A 80141C0F          DISPLAY 0X1C0F,0X15     ; DISPLAY 20 CHAR, START FROM ADDR 1C10
    429C C000B4A1          WINDOW  0XB4,0XA1,0X00  ; WINDOW INSTRUCTION W/
                                                   ; BORDER CHAR, GREEN, REVERSE & APL FONT
    429E 80263078          DISPLAY 0X3078,0X27     ; DISPLAY 39 WINDOW CHAR, START FROM ADDR 3078
    42A0 C000B4A1          WINDOW  0XB4,0XA1,0X00  ; WINDOW INSTRUCTION W/
                                                   ; BORDER CHAR, GREEN, REVERSE & APL FONT
    42A2 80121C4D          DISPLAY 0X1C4D,0X13     ; DISPLAY 19 CHAR, START FROM ADDR 1C4D
    42A4 40020000          NOP     NOT_SEE1        ; DISPLAY BLANK CHAR
    42A6 42050000          NOP     NOT_SEE2,HP     ; DISPLAY BLANK W/ HSYNC
    42A8 4804429A          LOOPBACK        NOT_SEE3,0X00,LOOP13     ; DISPLAY BLANK, INC LPCTR,
                                                   ; IF LPCTR < STOP ROW, LPBACK
                                                   ; ELSE GOTO NEXT INSTRUCTION
                     ;
                     ;       14TH LINE DISPLAY, WINDOW 5TH LINE
                     ;
    42AA 300E              ROW     0X0E            ; LOAD ROW COUNT TO SCN ROW REG
    42AB 240F              LOOP    0X00,0X0F       ; SETUP 16 SCAN LINES
                     LOOP14:
    42AC 80141C5F          DISPLAY 0X1C5F,0X15     ; DISPLAY 20 CHAR, START FROM ADDR 1C60
    42AE C000B4A1          WINDOW  0XB4,0XA1,0X00  ; WINDOW INSTRUCTION W/
                                                   ; BORDER CHAR, GREEN, REVERSE & APL FONT
    42B0 802630A0          DISPLAY 0X30A0,0X27     ; DISPLAY 39 WINDOW CHAR, START FROM ADDR 30A0
    42B2 C000B4A1          WINDOW  0XB4,0XA1,0X00  ; WINDOW INSTRUCTION W/
                                                   ; BORDER CHAR, GREEN, REVERSE & APL FONT
    42B4 80121C9D          DISPLAY 0X1C9D,0X13     ; DISPLAY 19 CHAR, START FROM ADDR 1C9D
    42B6 40020000          NOP     NOT_SEE1        ; DISPLAY BLANK CHAR
    42B8 42050000          NOP     NOT_SEE2,HP     ; DISPLAY BLANK W/ HSYNC
    42BA 480442AC          LOOPBACK        NOT_SEE3,0X00,LOOP14     ; DISPLAY BLANK, INC LPCTR,
                                                   ; IF LPCTR < STOP ROW, LPBACK
                                                   ; ELSE GOTO NEXT INSTRUCTION
                     ;
                     ;       15TH LINE DISPLAY, WINDOW 6TH LINE
                     ;
    42BC 300F              ROW     0X0F            ; LOAD ROW COUNT TO SCN ROW REG
    42BD 240F              LOOP    0X00,0X0F       ; SETUP 16 SCAN LINES

line adr code        input
                     LOOP15.
    42BE 80141 AF          DISPLAY 0X1CAF,0X15     ; DISPLAY 20 CHAR, START FROM ADDR 1CB0

    42C0 C000B4A1          WINDOW  0XB4,0XA1,0X00  ; WINDOW INSTRUCTION W/
                                                   ; BORDER CHAR, GREEN, REVERSE & APL FONT
    42C2 802630C8          DISPLAY 0X30C8,0X27     ; DISPLAY 39 WINDOW CHAR, START FROM ADDR 30C8
    42C4 C000B4A1          WINDOW  0XB4,0XA1,0X00  ; WINDOW INSTRUCTION W/
                                                   ; BORDER CHAR, GREEN, REVERSE & APL FONT
    42C6 80121CED          DISPLAY 0X1CED,0X13     ; DISPLAY 19 CHAR, START FROM ADDR 1CED
    42C8 40020000          NOP     NOT_SEE1        ; DISPLAY BLANK CHAR
    42CA 42050000          NOP     NOT_SEE2,HP     ; DISPLAY BLANK W/ HSYNC
    42CC 480442BE          LOOPBACK        NOT_SEE3,0X00,LOOP15     ; DISPLAY BLANK, INC LPCTR,
                                                   ; IF LPCTR < STOP ROW, LPBACK
                                                   ; ELSE GOTO NEXT INSTRUCTION
                     ;
                     ;       16TH LINE DISPLAY, WINDOW 7TH LINE
                     ;
    42CE 3010              ROW     0X10            ; LOAD ROW COUNT TO SCN ROW REG
    42CF 240F              LOOP    0X00,0X0F       ; SETUP 16 SCAN LINES
                     LOOP16:
    42D0 80141CFF          DISPLAY 0X1CFF,0X15     ; DISPLAY 20 CHAR, START FROM ADDR 1D00
    42D2 C000B4A1          WINDOW  0XB4,0XA1,0X00  ; WINDOW INSTRUCTION W/
                                                   ; BORDER CHAR, GREEN, REVERSE & APL FONT
    42D4 802630F0          DISPLAY 0X30F0,0X27     ; DISPLAY 39 WINDOW CHAR, START FROM ADDR 30F0
    42D6 C000B4A1          WINDOW  0XB4,0XA1,0X00  ; WINDOW INSTRUCTION W/
                                                   ; BORDER CHAR, GREEN, REVERSE & APL FONT
    42D8 80121D3D          DISPLAY 0X1D3D,0X13     ; DISPLAY 19 CHAR, START FROM ADDR 1D3D
    42DA 40020000          NOP     NOT_SEE1        ; DISPLAY BLANK CHAR
    42DC 42050000          NOP     NOT_SEE2,HP     ; DISPLAY BLANK W/ HSYNC
    42DE 480442D0          LOOPBACK        NOT_SEE3,0X00,LOOP16     ; DISPLAY BLANK, INC LPCTR,
                                                   ; IF LPCTR < STOP ROW, LPBACK
                                                   ; ELSE GOTO NEXT INSTRUCTION
                     ;
                     ;       17TH LINE DISPLAY, WINDOW 8TH LINE
                     ;
    42E0 3011              ROW     0X11            ; LOAD ROW COUNT TO SCN ROW REG
    42E1 240F              LOOP    0X00,0X0F       ; SETUP 16 SCAN LINES
                     LOOP17:
    42E2 80141D4F          DISPLAY 0X1D4F,0X15     ; DISPLAY 20 CHAR, START FROM ADDR 1D50
    42E4 C000B4A1          WINDOW  0XB4,0XA1,0X00  ; WINDOW INSTRUCTION W/
                                                   ; BORDER CHAR, GREEN, REVERSE & APL FONT
```

```
42E6 80263118          DISPLAY 0X3118,0X27     ; DISPLAY 39 WINDOW CHAR, START FROM ADDR 3118
42E8 C000B4A1          WINDOW  0XB4,0XA1,0X00  ; WINDOW INSTRUCTION W/
                                               ; BORDER CHAR, GREEN, REVERSE & APL FONT
42EA 80121D8D          DISPLAY 0X1D8D,0X13     ; DISPLAY 19 CHAR, START FROM ADDR 1D8D
42EC 40020000          NOP     NOT_SEE1        ; DISPLAY BLANK CHAR
42EE 42050000          NOP     NOT_SEE2,HP     ; DISPLAY BLANK W/ HSYNC
42F0 480442E2          LOOPBACK        NOT_SEE3,0X00,LOOP17     ; DISPLAY BLANK, INC LPCTR,
                                               ; IF LPCTR < STOP ROW, LPBACK
                                               ; ELSE GOTO NEXT INSTRUCTION
                 ;
                 ;     18TH LINE DISPLAY, WINDOW 9TH LINE
*

line adr code    input
                 ;
42F2 3012              ROW     0X12            ; LOAD ROW COUNT TO SCN ROW REG
42F3 240F              LOOP    0X00,0X0F       ; SETUP 16 SCAN LINES
                 LOOP18:
42F4 80141D9F          DISPLAY 0X1D9F,0X15     ; DISPLAY 20 CHAR, START FROM ADDR 1DA0
42F6 C000B4A1          WINDOW  0XB4,0XA1,0X00  ; WINDOW INSTRUCTION W/
                                               ; BORDER CHAR, GREEN, REVERSE & APL FONT
42F8 80263140          DISPLAY 0X3140,0X27     ; DISPLAY 39 WINDOW CHAR, START FROM ADDR 3140
42FA C000B4A1          WINDOW  0XB4,0XA1,0X00  ; WINDOW INSTRUCTION W/
                                               ; BORDER CHAR, GREEN, REVERSE & APL FONT
42FC 80121DDD          DISPLAY 0X1DDD,0X13     ; DISPLAY 19 CHAR, START FROM ADDR 1DDD
42FE 40020000          NOP     NOT_SEE1        ; DISPLAY BLANK CHAR
4300 42050000          NOP     NOT_SEE2,HP     ; DISPLAY BLANK W/ HSYNC
4302 480442F4          LOOPBACK        NOT_SEE3,0X00,LOOP18     ; DISPLAY BLANK, INC LPCTR,
                                               ; IF LPCTR < STOP ROW, LPBACK
                                               ; ELSE GOTO NEXT INSTRUCTION
                 ;
                 ;     19TH LINE DISPLAY, WINDOW 10TH LINE
                 ;
4304 3013              ROW     0X13            ; LOAD ROW COUNT TO SCN ROW REG
4305 240F              LOOP    0X00,0X0F       ; SETUP 16 SCAN LINES
                 LOOP19:
4306 80141DEF          DISPLAY 0X1DEF,0X15     ; DISPLAY 20 CHAR, START FROM ADDR 1DF0
4308 C000B4A1          WINDOW  0XB4,0XA1,0X00  ; WINDOW INSTRUCTION W/
                                               ; BORDER CHAR, GREEN, REVERSE & APL FONT
430A 80263168          DISPLAY 0X3168,0X27     ; DISPLAY 39 WINDOW CHAR, START FROM ADDR 3168
430C C000B4A1          WINDOW  0XB4,0XA1,0X00  ; WINDOW INSTRUCTION W/
                                               ; BORDER CHAR, GREEN, REVERSE & APL FONT
430E 80121E2D          DISPLAY 0X1E2D,0X13     ; DISPLAY 19 CHAR, START FROM ADDR 1E2D
4310 40020000          NOP     NOT_SEE1        ; DISPLAY BLANK CHAR
4312 42050000          NOP     NOT_SEE2,HP     ; DISPLAY BLANK W/ HSYNC
4314 48044306          LOOPBACK        NOT_SEE3,0X00,LOOP19     ; DISPLAY BLANK, INC LPCTR,
                                               ; IF LPCTR < STOP ROW, LPBACK
                                               ; ELSE GOTO NEXT INSTRUCTION
                 ;
                 ;     20TH LINE DISPLAY, WINDOW 11TH LINE
                 ;
4316 3014              ROW     0X14            ; LOAD ROW COUNT TO SCN ROW REG
4317 240F              LOOP    0X00,0X0F       ; SETUP 16 SCAN LINES
                 LOOP20:
4318 80141E3F          DISPLAY 0X1E3F,0X15     ; DISPLAY 20 CHAR, START FROM ADDR 1E40
431A C000B4A1          WINDOW  0XB4,0XA1,0X00  ; WINDOW INSTRUCTION W/
                                               ; BORDER CHAR, GREEN, REVERSE & APL FONT
431C 80263191          DISPLAY 0X3191,0X27     ; DISPLAY 39 WINDOW CHAR, START FROM ADDR 3191
431E C000B4A1          WINDOW  0XB4,0XA1,0X00  ; WINDOW INSTRUCTION W/
                                               ; BORDER CHAR, GREEN, REVERSE & APL FONT
4320 80121E7D          DISPLAY 0X1E7D,0X13     ; DISPLAY 19 CHAR, START FROM ADDR 1E7D
4322 40020000          NOP     NOT_SEE1        ; DISPLAY BLANK CHAR
4324 42050000          NOP     NOT_SEE2,HP     ; DISPLAY BLANK W/ HSYNC
4326 48044318          LOOPBACK        NOT_SEE3,0X00,LOOP20     ; DISPLAY BLANK, INC LPCTR,
                                               ; IF LPCTR < STOP ROW, LPBACK
*

line adr code    input
                                               ; ELSE GOTO NEXT INSTRUCTION
                 ;
                 ;     21TH LINE DISPLAY, WINDOW BORDER END ROW
                 ;
4328 3015              ROW     0X15            ; LOAD ROW COUNT TO SCN ROW REG
4329 240F              LOOP    0X00,0X0F       ; SETUP 16 SCAN LINES
                 LOOP21:
432A 80141E8F          DISPLAY 0X1E8F,0X15     ; DISPLAY 20 CHAR, START FROM ADDR 1E90
432C C0008BA1          WINDOW  0X8B,0XA1,0X00  ; WINDOW INSTRUCTION W/
                                               ; LEFT CORNER CHAR, GREEN, REVERSE & APL FONT
432E 802631BA          DISPLAY 0X31BA,0X27     ; DISPLAY 39 TIMES FOR BORDER CHAR
                                               ; BORDER CHAR W/ GREEN, REVERSE & APL FONT
4330 C0009BA1          WINDOW  0X9B,0XA1,0X00  ; WINDOW INSTRUCTION W/
                                               ; RIGHT CORNER CHAR, GREEN, REVERSE & APL FONT
4332 80121ECD          DISPLAY 0X1ECD,0X13     ; DISPLAY 19 CHAR, START FROM ADDR 1ECD
4334 40020000          NOP     NOT_SEE1        ; DISPLAY BLANK CHAR
4336 42050000          NOP     NOT_SEE2,HP     ; DISPLAY BLANK W/ HSYNC
4338 4804432A          LOOPBACK        NOT_SEE3,0X00,LOOP21     ; DISPLAY BLANK, INC LPCTR,
                                               ; IF LPCTR < STOP ROW, LPBACK
                                               ; ELSE GOTO NEXT INSTRUCTION
                 ;
                 ;     22TH LINE DISPLAY, STARTING ADDR IN 1EE0H
                 ;
433A 3016              ROW     0X16            ; LOAD ROW COUNT TO SCN ROW REG
433B 240F              LOOP    0X00,0X0F       ; SETUP 16 SCAN LINES
                 LOOP22:
```

BEST AVAILABLE COPY

```
433C 80501EDF        DISPLAY 0X1EDF,ROW_MAX     ; DISPLAY 80 CHAR, START FROM ADDR 1EE0
433E 40020000        NOP     NOT_SEE1          ; DISPLAY BLANK CHAR
4340 42050000        NOP     NOT_SEE2,HP       ; DISPLAY BLANK W/ HSYNC
4342 4804433C        LOOPBACK        NOT_SEE3,0X00,LOOP22    ; DISPLAY BLANK, INC LPCTR,
                                               ; IF LPCTR < STOP ROW, LPBACK
                                               ; ELSE GOTO NEXT INSTRUCTION
                     ;
                     ;      23TH LINE DISPLAY, STARTING ADDR IN 1F30H
                     ;
4344 3017            ROW     0X17              ; LOAD ROW COUNT TO SCN ROW REG
4345 240F            LOOP    0X00,0X0F         ; SETUP 16 SCAN LINES
                     LOOP23:
4346 80501F2F        DISPLAY 0X1F2F,ROW_MAX     ; DISPLAY 80 CHAR, START FROM ADDR 1F30
4348 40020000        NOP     NOT_SEE1          ; DISPLAY BLANK CHAR
434A 42050000        NOP     NOT_SEE2,HP       ; DISPLAY BLANK W/ HSYNC
434C 48044346        LOOPBACK        NOT_SEE3,0X00,LOOP23    ; DISPLAY BLANK, INC LPCTR,
                                               ; IF LPCTR < STOP ROW, LPBACK
                                               ; ELSE GOTO NEXT INSTRUCTION
                     ;
                     ;      24TH LINE DISPLAY, STARTING ADDR IN 1F80H
                     ;
434E 3018            ROW     0X18              ; LOAD ROW COUNT TO SCN ROW REG
434F 240F            LOOP    0X00,0X0F         ; SETUP 16 SCAN LINES
                     LOOP24:
4350 80501F7F        DISPLAY 0X1F7F,ROW_MAX     ; DISPLAY 80 CHAR, START FROM ADDR 1F80
*

line adr code        input
4352 40020000        NOP     NOT_SEE1          ; DISPLAY BLANK CHAR
4354 42050000        NOP     NOT_SEE2,HP       ; DISPLAY BLANK W/ HSYNC
4356 48044350        LOOPBACK        NOT_SEE3,0X00,LOOP24    ; DISPLAY BLANK, INC LPCTR,
                                               ; IF LPCTR < STOP ROW, LPBACK
                                               ; ELSE GOTO NEXT INSTRUCTION
                     ;
                     ;       3 SCAN LINES FOR SEPARATOR
                     ;
4358 3019            ROW     0X19              ; LOAD ROW COUNT TO SCN ROW REG
4359 2402            LOOP    0X00,0X02         ; SETUP 3 SCAN LINES
                     LOOP25:
435A 9050099F        DISPLAY 0X099F,ROW_MAX,S   ; DISPLAY 80 CHAR, START FROM ADDR 1800
435C 40020000        NOP     NOT_SEE1          ; DISPLAY BLANK CHAR
435E 42050000        NOP     NOT_SEE2,HP       ; DISPLAY BLANK W/ HSYNC
4360 4804435A        LOOPBACK        NOT_SEE3,0X00,LOOP25    ; DISPLAY BLANK, INC LPCTR,
                                               ; IF LPCTR < STOP ROW, LPBACK
                                               ; ELSE GOTO NEXT INSTRUCTION
                     ;
                     ;       STATUS LINE DISPLAY, STARTING ADDR IN 1800H
                     ;
4362 240E            LOOP    0X00,0X0E         ; SETUP 15 SCAN LINES
                     LOOP26:
4363 905017FF        DISPLAY 0X17FF,ROW_MAX,S   ; DISPLAY 81 CHAR, START FROM ADDR 1800
4365 40020000        NOP     NOT_SEE1          ; DISPLAY BLANK CHAR
4367 42050000        NOP     NOT_SEE2,HP       ; DISPLAY BLANK W/ HSYNC
4369 48044363        LOOPBACK        NOT_SEE3,0X00,LOOP26    ; DISPLAY BLANK, INC LPCTR,
                                               ; IF LPCTR < STOP ROW, LPBACK
                                               ; ELSE GOTO NEXT INSTRUCTION
436B 905017FF        DISPLAY 0X17FF,ROW_MAX,S   ; DISPLAY 81 CHAR, START FROM ADDR 1800
436D 50020000        NOP     NOT_SEE1,I        ; DISPLAY BLANK CHAR
436F 42050000        NOP     NOT_SEE2,HP       ; DISPLAY BLANK W/ HSYNC
4371 40040000        NOP     NOT_SEE3
                     ;
                     ;       DISPLAY 8 BLANK SCAN LINES
                     ;
4373 2407            LOOP    0X00,0X07         ; SETUP 8 SCAN LINES
                     LOOP27:
4374 40530000        NOP     ROW_MAX+NOT_SEE1        ; DISPLAY BLANK CHAR
4376 42050000        NOP     NOT_SEE2,HP       ; DISPLAY BLANK W/ HSYNC
4378 48044374        LOOPBACK        NOT_SEE3,0X00,LOOP27    ; DISPLAY BLANK, INC LPCTR,
                                               ; IF LPCTR < STOP ROW, LPBACK
                                               ; ELSE GOTO NEXT INSTRUCTION
                     ;
                     ;       DISPLAY 16 BLANK SCAN LINES W/ VSYNC
                     ;
437A 240F            LOOP    0X00,0X0F         ; SETUP 16 SCAN LINES
                     LOOP28:
437B 41530000        NOP     ROW_MAX+NOT_SEE1,VP     ; DISPLAY BLANK CHAR
437D 43050000        NOP     NOT_SEE2,HP,VP    ; DISPLAY BLANK W/ HSYNC
437F 4904437B        LOOPBACK        NOT_SEE3,0X00,LOOP28,VP ; DISPLAY BLANK, INC LPCTR,
                                               ; IF LPCTR < STOP ROW, LPBACK
*

line adr code        input
                                               ; ELSE GOTO NEXT INSTRUCTION
                     ;
                     ;       DISPLAY 16 BLANK SCAN LINES
                     ;
4381 240E            LOOP    0X00,0X0E         ; SETUP 15 SCAN LINES
                     LOOP29:
4382 40530000        NOP     ROW_MAX+NOT_SEE1        ; DISPLAY BLANK CHAR
4384 42050000        NOP     NOT_SEE2,HP       ; DISPLAY BLANK W/ HSYNC
4386 48044382        LOOPBACK        NOT_SEE3,0X00,LOOP29    ; DISPLAY BLANK, INC LPCTR,
                                               ; IF LPCTR < STOP ROW, LPBACK
                                               ; ELSE GOTO NEXT INSTRUCTION
```

```
                        ;
                        ;       SETUP START ADDRESS AND JUMP BACK
                        ;
4388 2400                       LOOP    0X00,0X00       ; SETUP 1 SCAN LINES
4389 40530000                   NOP     ROW_MAX+NOT_SEE1        ; DISPLAY BLANK CHAR
438B 42050000                   NOP     NOT_SEE2,HP     ; DISPLAY BLANK W/ HSYNC
438D 44044200                   JMP     NOT_SEE3,WIN_START      ; DISPLAY BLANK, INC LPCTR,
                                                        ; IF LPCTR < STOP ROW, LPBACK
                                                        ; ELSE JUMP TO START OF DL
                        ;
                        ;
```

Appendix 2

```
line adr code           input
                        ;************************************************************
                        ;*                                                          *
                        ;*   THIS IS DISPLAY LIST INSTRUCTION SET TO GENERATE THE DISPLAY   *
                        ;*   LIST DATA FOR SLOW SCREEN (24X80) WITH INTERLACE. THE SCREEN   *
                        ;*   FORMAT IS AS FOLOWS:                                   *
                        ;*                                                          *
                        ;*              -----------------------------------------  *
                        ;*              *    ----- 80 -----       * 3 * 6 * 6 *    *
                        ;*              * *                       *   *   *   *    *
                        ;*              * *          ---------    *   * H *   *    *
                        ;*              * *          *W      *    *   * S *   *    *
                        ;*              * 24         * I     *    *   * Y *   *    *
                        ;*              * *          *  N    *    *   * N *   *    *
                        ;*              * *          *   D   *    *   * C *   *    *
                        ;*              * *          *    O  *    *   *   *   *    *
                        ;*              *            *     W *    *   *   *   *    *
                        ;*              *            ---------    *   *   *   *    *
                        ;*              *                         *   *   *   *    *
                        ;*              *                         *   *   *   *    *
                        ;*              *-------------------------*---*---*---*    *
                        ;*              *      3 SCAN LINES ( DELIMITER )     *    *
                        ;*              --------------------------*---*---*---*    *
                        ;*              *     16 SCAN LINES ( STATUS LINE )   *    *
                        ;*              --------------------------*---*---*---*    *
                        ;*              *      8 SCAN LINES                   *    *
                        ;*              --------------------------*---*---*---*    *
                        ;*              *     16 SCAN LINES   VSYNC           *    *
                        ;*              --------------------------*---*---*---*    *
                        ;*              *     16 SCAN LINES                   *    *
                        ;*              -----------------------------------------  *
                        ;*                                                          *
                        ;*                                                          *
                        ;*                                                          *
                        ;************************************************************
                        ;
                        ;************************************************************
                        ;
                        #DEFINE ROW_MAX         81
                        #DEFINE NOT_SEE1        3
                        #DEFINE NOT_SEE2        6
                        #DEFINE NOT_SEE3        6

0A00                            ORG     0X0A00          ;                       CC

                        ;************* FIRST FIELD ***********************************


                        ;
                        ;       1ST LINE DISPLAY, STARTING ADDR IN 1850H
                        ;
                        MODE2_START:
0A00 3001                       ROW     0X01            ; ROW NUMBER
0A01 240E                       LOOP    0X00,0X0E       ; SETUP 16 SCAN LINES
*
line adr code           input
                        LP1:
0A02 8050184F                   DISPLAY 0X184F,ROW_MAX     ; DISPLAY 80 CHAR, START FROM ADDR 1850
0A04 40020000                   NOP     NOT_SEE1        ; DISPLAY BLANK CHAR
0A06 42050000                   NOP     NOT_SEE2,HP     ; DISPLAY BLANK W/ HSYNC
0A08 48058A02                   LOOPBACK        NOT_SEE3,0X01,LP1       ; DISPLAY BLANK, INC LPCTR,
                                                ; IF LPCTR < STOP ROW, LPBACK
                                                ; ELSE GOTO NEXT INSTRUCTION
                        ;
                        ;       2ND LINE DISPLAY, STARTING ADDR IN 18A0H
                        ;
0A0A 3002                       ROW     0X02            ; ROW NUMBER
0A0B 240E                       LOOP    0X00,0X0E       ; SETUP 16 SCAN LINES
                        LP2:
0A0C 8050189F                   DISPLAY 0X189F,ROW_MAX     ; DISPLAY 80 CHAR, START FROM ADDR 18A0
0A0E 40020000                   NOP     NOT_SEE1        ; DISPLAY BLANK CHAR
0A10 42050000                   NOP     NOT_SEE2,HP     ; DISPLAY BLANK W/ HSYNC
0A12 48058A0C                   LOOPBACK        NOT_SEE3,0X01,LP2       ; DISPLAY BLANK, INC LPCTR,
                                                ; IF LPCTR < STOP ROW, LPBACK
                                                ; ELSE GOTO NEXT INSTRUCTION
                        ;
                        ;       3RD LINE DISPLAY, STARTING ADDR IN 18F0H
                        ;
0A14 3003                       ROW     0X03            ; ROW NUMBER
0A15 240E                       LOOP    0X00,0X0E       ; SETUP 16 SCAN LINES
```

BEST AVAILABLE COPY

```
 76                       LP3:
 77 0A16 805018EF                DISPLAY 0X18EF,ROW_MAX      ; DISPLAY 80 CHAR, START FROM ADDR 18F0
 78 0A18 40020000                NOP      NOT_SEE1          ; DISPLAY BLANK CHAR
 79 0A1A 42050000                NOP      NOT_SEE2,HP       ; DISPLAY BLANK W/ HSYNC
 80 0A1C 48058A16                LOOPBACK         NOT_SEE3,0X01,LP3        ; DISPLAY BLANK, INC LPCTR,
 81                                                         ; IF LPCTR < STOP ROW, LPBACK
 82                                                         ; ELSE GOTO NEXT INSTRUCTION
 83                       ;
 84                       ;      4TH LINE DISPLAY, STARTING ADDR IN 1940H
 85                       ;
 86 0A1E 3004                    ROW      0X04              ; ROW NUMBER
 87 0A1F 240E                    LOOP     0X00,0X0E         ; SETUP 16 SCAN LINES
 88                       LP4:
 89 0A20 8050193F                DISPLAY 0X193F,ROW_MAX      ; DISPLAY 80 CHAR, START FROM ADDR 1940
 90 0A22 40020000                NOP      NOT_SEE1          ; DISPLAY BLANK CHAR
 91 0A24 42050000                NOP      NOT_SEE2,HP       ; DISPLAY BLANK W/ HSYNC
 92 0A26 48058A20                LOOPBACK         NOT_SEE3,0X01,LP4        ; DISPLAY BLANK, INC LPCTR,
 93                                                         ; IF LPCTR < STOP ROW, LPBACK
 94                                                         ; ELSE GOTO NEXT INSTRUCTION
 95                       ;
 96                       ;      5TH LINE DISPLAY, STARTING ADDR IN 1990H
 97                       ;
 98 0A28 3005                    ROW      0X05              ; ROW NUMBER
 99 0A29 240E                    LOOP     0X00,0X0E         ; SETUP 16 SCAN LINES
100                       LP5:
101 0A2A 8050198F                DISPLAY 0X198F,ROW_MAX      ; DISPLAY 80 CHAR, START FROM ADDR 1990
102 0A2C 40020000                NOP      NOT_SEE1          ; DISPLAY BLANK CHAR
*
line adr code          input
103 0A2E 42050000                NOP      NOT_SEE2,HP       ; DISPLAY BLANK W/ HSYNC
104 0A30 48058A2A                LOOPBACK         NOT_SEE3,0X01,LP5        ; DISPLAY BLANK, INC LPCTR,
105                                                         ; IF LPCTR < STOP ROW, LPBACK
106                                                         ; ELSE GOTO NEXT INSTRUCTION
107                       ;
108                       ;      6TH LINE DISPLAY, STARTING ADDR IN 19E0H
109                       ;
110 0A32 3006                    ROW      0X06              ; ROW NUMBER
111 0A33 240E                    LOOP     0X00,0X0E         ; SETUP 16 SCAN LINES
112                       LP6:
113 0A34 805019DF                DISPLAY 0X19DF,ROW_MAX      ; DISPLAY 80 CHAR, START FROM ADDR 19E0
114 0A36 40020000                NOP      NOT_SEE1          ; DISPLAY BLANK CHAR
115 0A38 42050000                NOP      NOT_SEE2,HP       ; DISPLAY BLANK W/ HSYNC
116 0A3A 48058A34                LOOPBACK         NOT_SEE3,0X01,LP6        ; DISPLAY BLANK, INC LPCTR,
117                                                         ; IF LPCTR < STOP ROW, LPBACK
118                                                         ; ELSE GOTO NEXT INSTRUCTION
119                       ;
120                       ;      7TH LINE DISPLAY, STARTING ADDR IN 1A30H
121                       ;
122 0A3C 3007                    ROW      0X07              ; ROW NUMBER
123 0A3D 240E                    LOOP     0X00,0X0E         ; SETUP 16 SCAN LINES
124                       LP7:
125 0A3E 80501A2F                DISPLAY 0X1A2F,ROW_MAX      ; DISPLAY 80 CHAR, START FROM ADDR 1A30
126 0A40 40020000                NOP      NOT_SEE1          ; DISPLAY BLANK CHAR
127 0A42 42050000                NOP      NOT_SEE2,HP       ; DISPLAY BLANK W/ HSYNC
128 0A44 48058A3E                LOOPBACK         NOT_SEE3,0X01,LP7        ; DISPLAY BLANK, INC LPCTR,
129                                                         ; IF LPCTR < STOP ROW, LPBACK
130                                                         ; ELSE GOTO NEXT INSTRUCTION
131                       ;
132                       ;      8TH LINE DISPLAY, STARTING ADDR IN 1A80H
133                       ;
134 0A46 3008                    ROW      0X08              ; ROW NUMBER
135 0A47 240E                    LOOP     0X00,0X0E         ; SETUP 16 SCAN LINES
136                       LP8:
137 0A48 80501A7F                DISPLAY 0X1A7F,ROW_MAX      ; DISPLAY 80 CHAR, START FROM ADDR 1A80
138 0A4A 40020000                NOP      NOT_SEE1          ; DISPLAY BLANK CHAR
139 0A4C 42050000                NOP      NOT_SEE2,HP       ; DISPLAY BLANK W/ HSYNC
140 0A4E 48058A48                LOOPBACK         NOT_SEE3,0X01,LP8        ; DISPLAY BLANK, INC LPCTR,
141                                                         ; IF LPCTR < STOP ROW, LPBACK
142                                                         ; ELSE GOTO NEXT INSTRUCTION
143                       ;
144                       ;      9TH LINE DISPLAY, STARTING ADDR IN 1AD0H
145                       ;
146 0A50 3009                    ROW      0X09              ; ROW NUMBER
147 0A51 240E                    LOOP     0X00,0X0E         ; SETUP 16 SCAN LINES
148                       LP9:
149 0A52 80501ACF                DISPLAY 0X1ACF,ROW_MAX      ; DISPLAY 80 CHAR, START FROM ADDR 1AD0
150 0A54 40020000                NOP      NOT_SEE1          ; DISPLAY BLANK CHAR
151 0A56 42050000                NOP      NOT_SEE2,HP       ; DISPLAY BLANK W/ HSYNC
152 0A58 48058A52                LOOPBACK         NOT_SEE3,0X01,LP9        ; DISPLAY BLANK, INC LPCTR,
153                                                         ; IF LPCTR < STOP ROW, LPBACK
*
line adr code          input

154                                                         ; ELSE GOTO NEXT INSTRUCTION
155                       ;
156                       ;      10TH LINE DISPLAY, STARTING ADDR IN 1B20H
157                       ;
158 0A5A 300A                    ROW      0X0A              ; ROW NUMBER
159 0A5B 240E                    LOOP     0X00,0X0E         ; SETUP 16 SCAN LINES
160                       LP10:
161 0A5C 80501B1F                DISPLAY 0X1B1F,ROW_MAX      ; DISPLAY 80 CHAR, START FROM ADDR 1B20
162 0A5E 40020000                NOP      NOT_SEE1          ; DISPLAY BLANK CHAR
```

BEST AVAILABLE COPY

```
0A60 42050000          NOP      NOT_SEE2,HP      ; DISPLAY BLANK W/ HSYNC
0A62 48058A5C          LOOPBACK        NOT_SEE3,0X01,LP10      ; DISPLAY BLANK, INC LPCTR,
                                                  ; IF LPCTR < STOP ROW, LPBACK
                                                  ; ELSE GOTO NEXT INSTRUCTION
                    ;
                    ;   11TH LINE DISPLAY, STARTING ADDR IN 1B70H
                    ;
0A64 300B              ROW      0X0B             ; ROW NUMBER
0A65 240E              LOOP     0X00,0X0E        ; SETUP 16 SCAN LINES
                    LP11:
0A66 80501B6F          DISPLAY 0X1B6F,ROW_MAX     ; DISPLAY 80 CHAR, START FROM ADDR 1B70
0A68 40020000          NOP      NOT_SEE1         ; DISPLAY BLANK CHAR
0A6A 42050000          NOP      NOT_SEE2,HP      ; DISPLAY BLANK W/ HSYNC
0A6C 48058A66          LOOPBACK        NOT_SEE3,0X01,LP11      ; DISPLAY BLANK, INC LPCTR,
                                                  ; IF LPCTR < STOP ROW, LPBACK
                                                  ; ELSE GOTO NEXT INSTRUCTION
                    ;
                    ;   12TH LINE DISPLAY, STARTING ADDR IN 1BC0H
                    ;
0A6E 300C              ROW      0X0C             ; ROW NUMBER
0A6F 240E              LOOP     0X00,0X0E        ; SETUP 16 SCAN LINES
                    LP12:
0A70 80501BBF          DISPLAY 0X1BBF,ROW_MAX     ; DISPLAY 80 CHAR, START FROM ADDR 1BC0
0A72 40020000          NOP      NOT_SEE1         ; DISPLAY BLANK CHAR
0A74 42050000          NOP      NOT_SEE2,HP      ; DISPLAY BLANK W/ HSYNC
0A76 48058A70          LOOPBACK        NOT_SEE3,0X01,LP12      ; DISPLAY BLANK, INC LPCTR,
                                                  ; IF LPCTR < STOP ROW, LPBACK
                                                  ; ELSE GOTO NEXT INSTRUCTION
                    ;
                    ;   13TH LINE DISPLAY, STARTING ADDR IN 1C10H
                    ;
0A78 300D              ROW      0X0D             ; ROW NUMBER
0A79 240E              LOOP     0X00,0X0E        ; SETUP 16 SCAN LINES
                    LP13:
0A7A 80501C0F          DISPLAY 0X1C0F,ROW_MAX     ; DISPLAY 80 CHAR, START FROM ADDR 1C10
0A7C 40020000          NOP      NOT_SEE1         ; DISPLAY BLANK CHAR
0A7E 42050000          NOP      NOT_SEE2,HP      ; DISPLAY BLANK W/ HSYNC
0A80 48058A7A          LOOPBACK        NOT_SEE3,0X01,LP13      ; DISPLAY BLANK, INC LPCTR,
                                                  ; IF LPCTR < STOP ROW, LPBACK
                                                  ; ELSE GOTO NEXT INSTRUCTION
                    ;
                    ;   14TH LINE DISPLAY, STARTING ADDR IN 1C60H
*

line adr code       input
                    ;
0A82 300E              ROW      0X0E             ; ROW NUMBER
0A83 240E              LOOP     0X00,0X0E        ; SETUP 16 SCAN LINES
                    LP14:
0A84 80501C5F          DISPLAY 0X1C5F,ROW_MAX     ; DISPLAY 80 CHAR, START FROM ADDR 1C60
0A86 40020000          NOP      NOT_SEE1         ; DISPLAY BLANK CHAR
0A88 42050000          NOP      NOT_SEE2,HP      ; DISPLAY BLANK W/ HSYNC
0A8A 48058A84          LOOPBACK        NOT_SEE3,0X01,LP14      ; DISPLAY BLANK, INC LPCTR,
                                                  ; IF LPCTR < STOP ROW, LPBACK
                                                  ; ELSE GOTO NEXT INSTRUCTION
                    ;
                    ;   15TH LINE DISPLAY, STARTING ADDR IN 1CB0H
                    ;
0A8C 300F              ROW      0X0F             ; ROW NUMBER
0A8D 240E              LOOP     0X00,0X0E        ; SETUP 16 SCAN LINES
                    LP15:
0A8E 80501CAF          DISPLAY 0X1CAF,ROW_MAX     ; DISPLAY 80 CHAR, START FROM ADDR 1CB0
0A90 40020000          NOP      NOT_SEE1         ; DISPLAY BLANK CHAR
0A92 42050000          NOP      NOT_SEE2,HP      ; DISPLAY BLANK W/ HSYNC
0A94 48058A8E          LOOPBACK        NOT_SEE3,0X01,LP15      ; DISPLAY BLANK, INC LPCTR,
                                                  ; IF LPCTR < STOP ROW, LPBACK
                                                  ; ELSE GOTO NEXT INSTRUCTION
                    ;
                    ;   16TH LINE DISPLAY, STARTING ADDR IN 1D00H
                    ;
0A96 3010              ROW      0X10             ; ROW NUMBER
0A97 240E              LOOP     0X00,0X0E        ; SETUP 16 SCAN LINES
                    LP16:
0A98 80501CFF          DISPLAY 0X1CFF,ROW_MAX     ; DISPLAY 80 CHAR, START FROM ADDR 1D00
0A9A 40020000          NOP      NOT_SEE1         ; DISPLAY BLANK CHAR
0A9C 42050000          NOP      NOT_SEE2,HP      ; DISPLAY BLANK W/ HSYNC
0A9E 48058A98          LOOPBACK        NOT_SEE3,0X01,LP16      ; DISPLAY BLANK, INC LPCTR,
                                                  ; IF LPCTR < STOP ROW, LPBACK
                                                  ; ELSE GOTO NEXT INSTRUCTION
                    ;
                    ;   17TH LINE DISPLAY, STARTING ADDR IN 1D50H
                    ;
0AA0 3011              ROW      0X11             ; ROW NUMBER
0AA1 240E              LOOP     0X00,0X0E        ; SETUP 16 SCAN LINES
                    LP17:
0AA2 80501D4F          DISPLAY 0X1D4F,ROW_MAX     ; DISPLAY 80 CHAR, START FROM ADDR 1D50
0AA4 40020000          NOP      NOT_SEE1         ; DISPLAY BLANK CHAR
0AA6 42050000          NOP      NOT_SEE2,HP      ; DISPLAY BLANK W/ HSYNC
0AA8 48058AA2          LOOPBACK        NOT_SEE3,0X01,LP17      ; DISPLAY BLANK, INC LPCTR,
                                                  ; IF LPCTR < STOP ROW, LPBACK
                                                  ; ELSE GOTO NEXT INSTRUCTION
                    ;
                    ;   18TH LINE DISPLAY, STARTING ADDR IN 1DA0H
                    ;
```

```
OAAA 3012              ROW      0X12               ; ROW NUMBER
OAAB 240E              LOOP     0X00,0X0E          ; SETUP 16 SCAN LINES
*

line adr code      input
                   LP18:
OAAC 8050109F              DISPLAY 0X1D9F.ROW MAX     : DISPLAY 80 CHAR, START FROM ADDR 1DA0
OAAE 40020000              NOP     NOT_SEE1        ; DISPLAY BLANK CHAR
OAB0 42050000              NOP     NOT_SEE2,HP     ; DISPLAY BLANK W/ HSYNC
OAB2 48058AAC              LOOPBACK        NOT_SEE3,0X01,LP18      ; DISPLAY BLANK, INC LPCTR,
                                                   ; IF LPCTR < STOP ROW, LPBACK
                                                   ; ELSE GOTO NEXT INSTRUCTION
                   ;
                   ;       19TH LINE DISPLAY, STARTING ADDR IN 1DF0H
                   ;
OAB4 3013                  ROW      0X13               ; ROW NUMBER
OAB5 240E                  LOOP     0X00,0X0E          ; SETUP 16 SCAN LINES
                   LP19:
OAB6 80501DEF              DISPLAY 0X1DEF,ROW_MAX     ; DISPLAY 80 CHAR, START FROM ADDR 1DF0
OAB8 40020000              NOP     NOT_SEE1        ; DISPLAY BLANK CHAR
OABA 42050000              NOP     NOT_SEE2,HP     ; DISPLAY BLANK W/ HSYNC
OABC 48058AB6              LOOPBACK        NOT_SEE3,0X01,LP19      ; DISPLAY BLANK, INC LPCTR,
                                                   ; IF LPCTR < STOP ROW, LPBACK
                                                   ; ELSE GOTO NEXT INSTRUCTION
                   ;
                   ;       20TH LINE DISPLAY, STARTING ADDR IN 1E40H
                   ;
OABE 3014                  ROW      0X14               ; ROW NUMBER
OABF 240E                  LOOP     0X00,0X0E          ; SETUP 16 SCAN LINES
                   LP20:
OAC0 80501E3F              DISPLAY 0X1E3F,ROW_MAX     ; DISPLAY 80 CHAR, START FROM ADDR 1E40
OAC2 40020000              NOP     NOT_SEE1        ; DISPLAY BLANK CHAR
OAC4 42050000              NOP     NOT_SEE2,HP     ; DISPLAY BLANK W/ HSYNC
OAC6 48058AC0              LOOPBACK        NOT_SEE3,0X01,LP20      ; DISPLAY BLANK, INC LPCTR,
                                                   ; IF LPCTR < STOP ROW, LPBACK
                                                   ; ELSE GOTO NEXT INSTRUCTION
                   ;
                   ;       21TH LINE DISPLAY, STARTING ADDR IN 1E90H
                   ;
OAC8 3015                  ROW      0X15               ; ROW NUMBER
OAC9 240E                  LOOP     0X00,0X0E          ; SETUP 16 SCAN LINES
                   LP21:
OACA 80501E8F              DISPLAY 0X1E8F,ROW_MAX     ; DISPLAY 80 CHAR, START FROM ADDR 1E90
OACC 40020000              NOP     NOT_SEE1        ; DISPLAY BLANK CHAR
OACE 42050000              NOP     NOT_SEE2,HP     ; DISPLAY BLANK W/ HSYNC
OAD0 48058ACA              LOOPBACK        NOT_SEE3,0X01,LP21      ; DISPLAY BLANK, INC LPCTR,
                                                   ; IF LPCTR < STOP ROW, LPBACK
                                                   ; ELSE GOTO NEXT INSTRUCTION
                   ;
                   ;       22TH LINE DISPLAY, STARTING ADDR IN 1EE0H
                   ;
OAD2 3016                  ROW      0X16               ; ROW NUMBER
OAD3 240E                  LOOP     0X00,0X0E          ; SETUP 16 SCAN LINES
                   LP22:
OAD4 80501EDF              DISPLAY 0X1EDF,ROW_MAX     ; DISPLAY 80 CHAR, START FROM ADDR 1EE0
OAD6 40020000              NOP     NOT_SEE1        ; DISPLAY BLANK CHAR
*

line adr code      input
OAD8 42050000              NOP     NOT_SEE2,HP     ; DISPLAY BLANK W/ HSYNC
OADA 48058AD4              LOOPBACK        NOT_SEE3,0X01,LP22      ; DISPLAY BLANK, INC LPCTR,
                                                   ; IF LPCTR < STOP ROW, LPBACK

                                                   ; ELSE GOTO NEXT INSTRUCTION
                   ;
                   ;       23TH LINE DISPLAY, STARTING ADDR IN 1F30H
                   ;
OADC 3017                  ROW      0X17               ; ROW NUMBER
OADD 240E                  LOOP     0X00,0X0E          ; SETUP 16 SCAN LINES
                   LP23:
OADE 80501F2F              DISPLAY 0X1F2F,ROW_MAX     ; DISPLAY 80 CHAR, START FROM ADDR 1F30
OAE0 40020000              NOP     NOT_SEE1        ; DISPLAY BLANK CHAR
OAE2 42050000              NOP     NOT_SEE2,HP     ; DISPLAY BLANK W/ HSYNC
OAE4 48058ADE              LOOPBACK        NOT_SEE3,0X01,LP23      ; DISPLAY BLANK, INC LPCTR,
                                                   ; IF LPCTR < STOP ROW, LPBACK
                                                   ; ELSE GOTO NEXT INSTRUCTION
                   ;
                   ;       24TH LINE DISPLAY, STARTING ADDR IN 1F80H
                   ;
OAE6 3018                  ROW      0X18               ; ROW NUMBER
OAE7 240E                  LOOP     0X00,0X0E          ; SETUP 16 SCAN LINES
                   LP24:
OAE8 80501F7F              DISPLAY 0X1F7F,ROW_MAX     ; DISPLAY 80 CHAR, START FROM ADDR 1F80
OAEA 40020000              NOP     NOT_SEE1        ; DISPLAY BLANK CHAR
OAEC 42050000              NOP     NOT_SEE2,HP     ; DISPLAY BLANK W/ HSYNC
OAEE 48058AE8              LOOPBACK        NOT_SEE3,0X01,LP24      ; DISPLAY BLANK, INC LPCTR,
                                                   ; IF LPCTR < STOP ROW, LPBACK
                                                   ; ELSE GOTO NEXT INSTRUCTION
                   ;
                   ;       3 SCAN LINES FOR SEPARATOR
                   ;
OAF0 3019                  ROW      0X19               ; ROW NUMBER
OAF1 2402                  LOOP     0X00,0X02          ; SETUP 3 SCAN LINES
                   LP25:
```

BEST AVAILABLE COPY

```
0AF2 9050099F                DISPLAY 0X099F,ROW_MAX,S   ; DISPLAY 80 CHAR, START FROM ADDR 09FF
0AF4 40020000                NOP      NOT_SEE1          ; DISPLAY BLANK CHAR
0AF6 42050000                NOP      NOT_SEE2,HP       ; DISPLAY BLANK W/ HSYNC
0AF8 48058AF2                LOOPBACK         NOT_SEE3,0X01,LP25      ; DISPLAY BLANK, INC LPCTR,
                                                        ; IF LPCTR < STOP ROW, LPBACK
                                                        ; ELSE GOTO NEXT INSTRUCTION
                         ;
                         ;       STATUS LINE DISPLAY, STARTING ADDR IN 1800H
                         ;
0AFA 240E                    LOOP     0X00,0X0E         ; SETUP 15 SCAN LINES
                         LP26:
0AFB 905017FF                DISPLAY 0X17FF,ROW_MAX,S   ; DISPLAY 80 CHAR, START FROM ADDR 1800
0AFD 40020000                NOP      NOT_SEE1          ; DISPLAY BLANK CHAR
0AFF 42050000                NOP      NOT_SEE2,HP       ; DISPLAY BLANK W/ HSYNC
0B01 48058AFB                LOOPBACK         NOT_SEE3,0X01,LP26      ; DISPLAY BLANK, INC LPCTR,
                                                        ; IF LPCTR < STOP ROW, LPBACK
                                                        ; ELSE GOTO NEXT INSTRUCTION
*

line adr code            input
0B03 905017FF                DISPLAY 0X17FF,ROW_MAX,S   ; DISPLAY 80 CHAR, START FROM ADDR 1800
0B05 50020000                NOP      NOT_SEE1,I        ; DISPLAY BLANK CHAR
0B07 42050000                NOP      NOT_SEE2,HP       ; DISPLAY BLANK W/ HSYNC
0B09 40050000                NOP      NOT_SEE3          ; DISPLAY BLANK, INC LPCTR,
                                                        ; IF LPCTR < STOP ROW, LPBACK
                                                        ; ELSE GOTO NEXT INSTRUCTION
                         ;
                         ;       DISPLAY 8 BLANK SCAN LINES
                         ;
0B0B 2406                    LOOP     0X00,0X06         ; SETUP 8 SCAN LINES
                         LP27:
0B0C 40530000                NOP      ROW_MAX+NOT_SEE1          ; DISPLAY BLANK CHAR
0B0E 42050000                NOP      NOT_SEE2,HP       ; DISPLAY BLANK W/ HSYNC
0B10 48058B0C                LOOPBACK         NOT_SEE3,0X01,LP27      ; DISPLAY BLANK, INC LPCTR,
                                                        ; IF LPCTR < STOP ROW, LPBACK
                                                        ; ELSE GOTO NEXT INSTRUCTION

                         ;
                         ;       THE VERTICAL BLANK (VP, TOTAL 16 SCAN LINES) PORTION IS DIVIDED
                         ;       INTO 3 SECTION:
                         ;               (1) 1ST SCAN LINE WITH VP IN THE 2ND HALF
                         ;               (2) 14 SCAN LINES WITH NORMAL VP
                         ;               (3) LAST SCAN LINE WITH VP IN THE 1ST HALF
                         ;       NOTE: THIS SCHEME IS ONLY REQUIRED FOR THE 1ST FIELD!
                         ;
                         ;       DISPLAY 1 BLANK SCAN LINE WITH VP IN THE 2ND HALF
                         ;
0B12 40290000                NOP      (ROW_MAX+NOT_SEE1)/2
0B14 412C0000                NOP      (ROW_MAX+NOT_SEE1)-(ROW_MAX-NOT_SEE1)/2,VP
0B16 43050000                NOP      NOT_SEE2,VP,HP
0B18 41050000                NOP      NOT_SEE3,VP
                         ;
                         ;       DISPLAY 14 BLANK SCAN LINES W/ VSYNC
                         ;
0B1A 240C                    LOOP     0X00,0X0C         ; SETUP 13 SCAN LINES
                         LP28:
0B1B 41530000                NOP      ROW_MAX+NOT_SEE1,VP       ; DISPLAY BLANK CHAR
0B1D 43050000                NOP      NOT_SEE2,HP,VP    ; DISPLAY  BLANK W/ HSYNC
0B1F 49058B1B                LOOPBACK         NOT_SEE3,0X01,LP28,VP   ; DISPLAY  BLANK, INC LPCTR,
                                                        ; IF LPCTR < STOP ROW, LPBACK
                                                        ; ELSE GOTO NEXT INSTRUCTION

                         ;
                         ;       DISPLAY 1 BLANK SCAN LINE WITH VP IN THE 1ST HALF
                         ;
0B21 412C0000                NOP      (ROW_MAX+NOT_SEE1)-(ROW_MAX-NOT_SEE1)/2,VP
0B23 40290000                NOP      (ROW_MAX+NOT_SEE1)/2
0B25 42050000                NOP      NOT_SEE2,HP
0B27 40050000                NOP      NOT_SEE3
                         ;
                         ;       DISPLAY 16 BLANK SCAN LINES
*

line adr code            input
                         ;
0B29 240E                    LOOP     0X00,0X0E         ; SETUP 15 SCAN LINES
                         LP29:
0B2A 40530000                NOP      ROW_MAX+NOT_SEE1          ; DISPLAY BLANK CHAR
0B2C 42050000                NOP      NOT_SEE2,HP       ; DISPLAY BLANK W/ HSYNC

0B2E 48058B2A                LOOPBACK         NOT_SEE3,0X01,LP29      ; DISPLAY BLANK, INC LPCTR,
                                                        ; IF LPCTR < STOP ROW, LPBACK
                                                        ; ELSE GOTO NEXT INSTRUCTION
                         ;
                         ;       SETUP START ADDRESS AND JUMP BACK
                         ;
0B30 2400                    LOOP     0X00,0X00         ; SETUP 1 SCAN LINES
0B31 40530000                NOP      ROW_MAX+NOT_SEE1          ; DISPLAY BLANK CHAR
0B33 42050000                NOP      NOT_SEE2,HP       ; DISPLAY BLANK W/ HSYNC
0B35 44054200                JMP      NOT_SEE3,SECOND_FIELD

4200                         ORG      0X4200
```

```
                  ;************* SECOND FIELD ****************************************

                  ;
                  ;          1ST LINE DISPLAY, STARTING ADDR IN 1850H
                  ;
                  SECOND_FIELD:
4200 3001                   ROW      0X01              ; ROW NUMBER
4201 242F                   LOOP     0X01,0X0F         ; SETUP 16 SCAN LINES
                  LP1X:
4202 8050184F               DISPLAY 0X184F,ROW_MAX      ; DISPLAY 80 CHAR, START FROM ADDR 1850
4204 40020000               NOP      NOT_SEE1          ; DISPLAY BLANK CHAR
4206 42050000               NOP      NOT_SEE2,HP       ; DISPLAY BLANK W/ HSYNC
4208 4805C202               LOOPBACK        NOT_SEE3,0X01,LP1X      ; DISPLAY BLANK, INC LPCTR,
                                                       ; IF LPCTR < STOP ROW, LPBACK
                                                       ; ELSE GOTO NEXT INSTRUCTION

                  ;
                  ;          2ND LINE DISPLAY, STARTING ADDR IN 18A0H
                  ;
420A 3002                   ROW      0X02              ; ROW NUMBER
420B 242F                   LOOP     0X01,0X0F         ; SETUP 16 SCAN LINES
                  LP2X:
420C 8050189F               DISPLAY 0X189F,ROW_MAX      ; DISPLAY 80 CHAR, START FROM ADDR 18A0
420E 40020000               NOP      NOT_SEE1          ; DISPLAY BLANK CHAR
4210 42050000               NOP      NOT_SEE2,HP       ; DISPLAY BLANK W/ HSYNC
4212 4805C20C               LOOPBACK        NOT_SEE3,0X01,LP2X      ; DISPLAY BLANK, INC LPCTR,
                                                       ; IF LPCTR < STOP ROW, LPBACK
                                                       ; ELSE GOTO NEXT INSTRUCTION

                  ;
                  ;          3RD LINE DISPLAY, STARTING ADDR IN 18F0H
                  ;
4214 3003                   ROW      0X03              ; ROW NUMBER
4215 242F                   LOOP     0X01,0X0F         ; SETUP 16 SCAN LINES
                  LP3X:
*

line adr code     input
4216 805018EF               DISPLAY 0X18EF,ROW_MAX      ; DISPLAY 80 CHAR, START FROM ADDR 18F0
4218 40020000               NOP      NOT_SEE1          ; DISPLAY BLANK CHAR
421A 42050000               NOP      NOT_SEE2,HP       ; DISPLAY BLANK W/ HSYNC
421C 4805C216               LOOPBACK        NOT_SEE3,0X01,LP3X      ; DISPLAY BLANK, INC LPCTR,
                                                       ; IF LPCTR < STOP ROW, LPBACK
                                                       ; ELSE GOTO NEXT INSTRUCTION

                  ;
                  ;          4TH LINE DISPLAY, STARTING ADDR IN 1940H
                  ;
421E 3004                   ROW      0X04              ; ROW NUMBER
421F 242F                   LOOP     0X01,0X0F         ; SETUP 16 SCAN LINES
                  LP4X:
4220 8050193F               DISPLAY 0X193F,ROW_MAX      ; DISPLAY 80 CHAR, START FROM ADDR 1940
4222 40020000               NOP      NOT_SEE1          ; DISPLAY BLANK CHAR
4224 42050000               NOP      NOT_SEE2,HP       ; DISPLAY BLANK W/ HSYNC
4226 4805C220               LOOPBACK        NOT_SEE3,0X01,LP4X      ; DISPLAY BLANK, INC LPCTR,
                                                       ; IF LPCTR < STOP ROW, LPBACK
                                                       ; ELSE GOTO NEXT INSTRUCTION

                  ;
                  ;          5TH LINE DISPLAY, STARTING ADDR IN 1990H
                  ;
4228 3005                   ROW      0X05              ; ROW NUMBER
4229 242F                   LOOP     0X01,0X0F         ; SETUP 16 SCAN LINES
                  LP5X:
422A 8050198F               DISPLAY 0X198F,ROW_MAX      ; DISPLAY 80 CHAR, START FROM ADDR 1990
422C 40020000               NOP      NOT_SEE1          ; DISPLAY BLANK CHAR
422E 42050000               NOP      NOT_SEE2,HP       ; DISPLAY BLANK W/ HSYNC
4230 4805C22A               LOOPBACK        NOT_SEE3,0X01,LP5X      ; DISPLAY BLANK, INC LPCTR,
                                                       ; IF LPCTR < STOP ROW, LPBACK
                                                       ; ELSE GOTO NEXT INSTRUCTION

                  ;
                  ;          6TH LINE DISPLAY, STARTING ADDR IN 19E0H
                  ;
4232 3006                   ROW      0X06              ; ROW NUMBER
4233 242F                   LOOP     0X01,0X0F         ; SETUP 16 SCAN LINES
                  LP6X:
4234 805019DF               DISPLAY 0X19DF,ROW_MAX      ; DISPLAY 80 CHAR, START FROM ADDR 19E0
4236 40020000               NOP      NOT_SEE1          ; DISPLAY BLANK CHAR
4238 42050000               NOP      NOT_SEE2,HP       ; DISPLAY BLANK W/ HSYNC
423A 4805C234               LOOPBACK        NOT_SEE3,0X01,LP6X      ; DISPLAY BLANK, INC LPCTR,
                                                       ; IF LPCTR < STOP ROW, LPBACK
                                                       ; ELSE GOTO NEXT INSTRUCTION

                  ;
                  ;          7TH LINE DISPLAY, STARTING ADDR IN 1A30H
                  ;
423C 3007                   ROW      0X07              ; ROW NUMBER
423D 242F                   LOOP     0X01,0X0F         ; SETUP 16 SCAN LINES
                  LP7X:
423E 80501A2F               DISPLAY 0X1A2F,ROW_MAX      ; DISPLAY 80 CHAR, START FROM ADDR 1A30
4240 40020000               NOP      NOT_SEE1          ; DISPLAY BLANK CHAR
4242 42050000               NOP      NOT_SEE2,HP       ; DISPLAY BLANK W/ HSYNC
*

line adr code     input
4244 4805C23E               LOOPBACK        NOT_SEE3,0X01,LP7X      ; DISPLAY BLANK, INC LPCTR,
                                                       ; IF LPCTR < STOP ROW, LPBACK
                                                       ; ELSE GOTO NEXT INSTRUCTION

                  ;
```

```
                     ;       8TH LINE DISPLAY, STARTING ADDR IN 1A80H
                     ;
4246 3008                    ROW      0X08              ; ROW NUMBER
4247 242F                    LOOP     0X01,0X0F         ; SETUP 16 SCAN LINES
                     LP8X:
4248 80501A7F                DISPLAY 0X1A7F,ROW_MAX      ; DISPLAY 80 CHAR, START FROM ADDR 1A80
424A 40020000                NOP      NOT_SEE1          ; DISPLAY BLANK CHAR
424C 42050000                NOP      NOT_SEE2,HP       ; DISPLAY BLANK W/ HSYNC
424E 4805C248                LOOPBACK        NOT_SEE3,0X01,LP8X       ; DISPLAY BLANK, INC LPCTR,
                                                        ; IF LPCTR < STOP ROW, LPBACK
                                                        ; ELSE GOTO NEXT INSTRUCTION
                     ;
                     ;       9TH LINE DISPLAY, STARTING ADDR IN 1AD0H
                     ;
4250 3009                    ROW      0X09              ; ROW NUMBER
4251 242F                    LOOP     0X01,0X0F         ; SETUP 16 SCAN LINES
                     LP9X:
4252 80501ACF                DISPLAY 0X1ACF,ROW_MAX      ; DISPLAY 80 CHAR, START FROM ADDR 1AD0
4254 40020000                NOP      NOT_SEE1          ; DISPLAY BLANK CHAR
4256 42050000                NOP      NOT_SEE2,HP       ; DISPLAY BLANK W/ HSYNC
4258 4805C252                LOOPBACK        NOT_SEE3,0X01,LP9X       ; DISPLAY BLANK, INC LPCTR,
                                                        ; IF LPCTR < STOP ROW, LPBACK
                                                        ; ELSE GOTO NEXT INSTRUCTION
                     ;
                     ;       10TH LINE DISPLAY, STARTING ADDR IN 1B20H
                     ;
425A 300A                    ROW      0X0A              ; ROW NUMBER
425B 242F                    LOOP     0X01,0X0F         ; SETUP 16 SCAN LINES
                     LP10X:
425C 80501B1F                DISPLAY 0X1B1F,ROW_MAX      ; DISPLAY 80 CHAR, START FROM ADDR 1B20
425E 40020000                NOP      NOT_SEE1          ; DISPLAY BLANK CHAR
4260 42050000                NOP      NOT_SEE2,HP       ; DISPLAY BLANK W/ HSYNC
4262 4805C25C                LOOPBACK        NOT_SEE3,0X01,LP10X      ; DISPLAY BLANK, INC LPCTR,
                                                        ; IF LPCTR < STOP ROW, LPBACK
                                                        ; ELSE GOTO NEXT INSTRUCTION
                     ;
                     ;       11TH LINE DISPLAY, STARTING ADDR IN 1B70H
                     ;
4264 300B                    ROW      0X0B              ; ROW NUMBER
4265 242F                    LOOP     0X01,0X0F         ; SETUP 16 SCAN LINES
                     LP11X:
4266 80501B6F                DISPLAY 0X1B6F,ROW_MAX      ; DISPLAY 80 CHAR, START FROM ADDR 1B70
4268 40020000                NOP      NOT_SEE1          ; DISPLAY BLANK CHAR
426A 42050000                NOP      NOT_SEE2,HP       ; DISPLAY BLANK W/ HSYNC
426C 4805C266                LOOPBACK        NOT_SEE3,0X01,LP11X      ; DISPLAY BLANK, INC LPCTR,
                                                        ; IF LPCTR < STOP ROW, LPBACK
                                                        ; ELSE GOTO NEXT INSTRUCTION
*

line adr code        input
                     ;
                     ;       12TH LINE DISPLAY, STARTING ADDR IN 1BC0H
                     ;
426E 300C                    ROW      0X0C              ; ROW NUMBER
426F 242F                    LOOP     0X01,0X0F         ; SETUP 16 SCAN LINES
                     LP12X:
4270 80501BBF                DISPLAY 0X1BBF,ROW_MAX      ; DISPLAY 80 CHAR, START FROM ADDR 1BC0
4272 40020000                NOP      NOT_SEE1          ; DISPLAY BLANK CHAR
4274 42050000                NOP      NOT_SEE2,HP       ; DISPLAY BLANK W/ HSYNC
4276 4805C270                LOOPBACK        NOT_SEE3,0X01,LP12X      ; DISPLAY BLANK, INC LPCTR,
                                                        ; IF LPCTR < STOP ROW, LPBACK
                                                        ; ELSE GOTO NEXT INSTRUCTION
                     ;
                     ;       13TH LINE DISPLAY, STARTING ADDR IN 1C10H
                     ;
4278 300D                    ROW      0X0D              ; ROW NUMBER
4279 242F                    LOOP     0X01,0X0F         ; SETUP 16 SCAN LINES
                     LP13X:
427A 80501C0F                DISPLAY 0X1C0F,ROW_MAX      ; DISPLAY 80 CHAR, START FROM ADDR 1C10
427C 40020000                NOP      NOT_SEE1          ; DISPLAY BLANK CHAR
427E 42050000                NOP      NOT_SEE2,HP       ; DISPLAY BLANK W/ HSYNC
4280 4805C27A                LOOPBACK        NOT_SEE3,0X01,LP13X      ; DISPLAY BLANK, INC LPCTR,
                                                        ; IF LPCTR < STOP ROW, LPBACK
                                                        ; ELSE GOTO NEXT INSTRUCTION
                     ;
                     ;       14TH LINE DISPLAY, STARTING ADDR IN 1C60H
                     ;
4282 300E                    ROW      0X0E              ; ROW NUMBER
4283 242F                    LOOP     0X01,0X0F         ; SETUP 16 SCAN LINES
                     LP14X:
4284 80501C5F                DISPLAY 0X1C5F,ROW_MAX      ; DISPLAY 80 CHAR, START FROM ADDR 1C60
4286 40020000                NOP      NOT_SEE1          ; DISPLAY BLANK CHAR
4288 42050000                NOP      NOT_SEE2,HP       ; DISPLAY BLANK W/ HSYNC
428A 4805C284                LOOPBACK        NOT_SEE3,0X01,LP14X      ; DISPLAY BLANK, INC LPCTR,
                                                        ; IF LPCTR < STOP ROW, LPBACK
                                                        ; ELSE GOTO NEXT INSTRUCTION
                     ;
                     ;       15TH LINE DISPLAY, STARTING ADDR IN 1CB0H
                     ;
428C 300F                    ROW      0X0F              ; ROW NUMBER
428D 242F                    LOOP     0X01,0X0F         ; SETUP 16 SCAN LINES
                     LP15X:
```

BEST AVAILABLE COPY

```
    428E 80501CAF            DISPLAY 0X1CAF,ROW_MAX      ; DISPLAY 80 CHAR, START FROM ADDR 1CB0
    4290 40020000            NOP      NOT_SEE1          ; DISPLAY BLANK CHAR
    4292 42050000            NOP      NOT_SEE2,HP       ; DISPLAY BLANK W/ HSYNC
    4294 4805C28E            LOOPBACK        NOT_SEE3,0X01,LP15X      ; DISPLAY BLANK, INC LPCTR,
                                                        ; IF LPCTR < STOP ROW, LPBACK
                                                        ; ELSE GOTO NEXT INSTRUCTION
                         ;
                         ;       16TH LINE DISPLAY, STARTING ADDR IN 1D00H
                         ;
*

line adr code          input
    4296 3010                ROW      0X10              ; ROW NUMBER
    4297 242F                LOOP     0X01,0X0F         ; SETUP 16 SCAN LINES
                         LP16X:
    4298 80501CFF            DISPLAY 0X1CFF,ROW_MAX      ; DISPLAY 80 CHAR, START FROM ADDR 1D00
    429A 40020000            NOP      NOT_SEE1          ; DISPLAY BLANK CHAR
    429C 42050000            NOP      NOT_SEE2,HP       ; DISPLAY BLANK W/ HSYNC
    429E 4805C298            LOOPBACK        NOT_SEE3,0X01,LP16X      ; DISPLAY BLANK, INC LPCTR
                                                        ; IF LPCTR < STOP ROW, LPBACK
                                                        ; ELSE GOTO NEXT INSTRUCTION
                         ;
                         ;       17TH LINE DISPLAY, STARTING ADDR IN 1D50H
                         ;
    42A0 3011                ROW      0X11              ; ROW NUMBER
    42A1 242F                LOOP     0X01,0X0F         ; SETUP 16 SCAN LINES
                         LP17X:
    42A2 80501D4F            DISPLAY 0X1D4F,ROW_MAX      ; DISPLAY 80 CHAR, START FROM ADDR 1D50
    42A4 40020000            NOP      NOT_SEE1          ; DISPLAY BLANK CHAR
    42A6 42050000            NOP      NOT_SEE2,HP       ; DISPLAY BLANK W/ HSYNC
    42A8 4805C2A2            LOOPBACK        NOT_SEE3,0X01,LP17X      ; DISPLAY BLANK, INC LPCTR,
                                                        ; IF LPCTR < STOP ROW, LPBACK
                                                        ; ELSE GOTO NEXT INSTRUCTION
                         ;
                         ;       18TH LINE DISPLAY, STARTING ADDR IN 1DA0H
                         ;
    42AA 3012                ROW      0X12              ; ROW NUMBER
    42AB 242F                LOOP     0X01,0X0F         ; SETUP 16 SCAN LINES
                         LP18X:
    42AC 80501D9F            DISPLAY 0X1D9F,ROW_MAX      ; DISPLAY 80 CHAR, START FROM ADDR 1DA0
    42AE 40020000            NOP      NOT_SEE1          ; DISPLAY BLANK CHAR
    42B0 42050000            NOP      NOT_SEE2,HP       ; DISPLAY BLANK W/ HSYNC
    42B2 4805C2AC            LOOPBACK        NOT_SEE3,0X01,LP18X      ; DISPLAY BLANK, INC LPCTR,
                                                        ; IF LPCTR < STOP ROW, LPBACK
                                                        ; ELSE GOTO NEXT INSTRUCTION
                         ;
                         ;       19TH LINE DISPLAY, STARTING ADDR IN 1DF0H
                         ;
    42B4 3013                ROW      0X13              ; ROW NUMBER
    42B5 242F                LOOP     0X01,0X0F         ; SETUP 16 SCAN LINES
                         LP19X:
    42B6 80501DEF            DISPLAY 0X1DEF,ROW_MAX      ; DISPLAY 80 CHAR, START FROM ADDR 1DF0
    42B8 40020000            NOP      NOT_SEE1          ; DISPLAY BLANK CHAR
    42BA 42050000            NOP      NOT_SEE2,HP       ; DISPLAY BLANK W/ HSYNC
    42BC 4805C2B6            LOOPBACK        NOT_SEE3,0X01,LP19X      ; DISPLAY BLANK, INC LPCTR,
                                                        ; IF LPCTR < STOP ROW, LPBACK
                                                        ; ELSE GOTO NEXT INSTRUCTION
                         ;
                         ;       20TH LINE DISPLAY, STARTING ADDR IN 1E40H
                         ;
    42BE 3014                ROW      0X14              ; ROW NUMBER
    42BF 242F                LOOP     0X01,0X0F         ; SETUP 16 SCAN LINES
                         LP20X:
*

line adr code          input
    42C0 80501E3F            DISPLAY 0X1E3F,ROW_MAX      ; DISPLAY 80 CHAR, START FROM ADDR 1E40
    42C2 40020000            NOP      NOT_SEE1          ; DISPLAY BLANK CHAR
    42C4 42050000            NOP      NOT_SEE2,HP       ; DISPLAY BLANK W/ HSYNC
    42C6 4805C2C0            LOOPBACK        NOT_SEE3,0X01,LP20X      ; DISPLAY BLANK, INC LPCTR,
                                                        ; IF LPCTR < STOP ROW, LPBACK
                                                        ; ELSE GOTO NEXT INSTRUCTION
                         ;
                         ;       21TH LINE DISPLAY, STARTING ADDR IN 1E90H
                         ;
    42C8 3015                ROW      0X15              ; ROW NUMBER
    42C9 242F                LOOP     0X01,0X0F         ; SETUP 16 SCAN LINES
                         LP21X:
    42CA 80501E8F            DISPLAY 0X1E8F,ROW_MAX      ; DISPLAY 80 CHAR, START FROM ADDR 1E90
    42CC 40020000            NOP      NOT_SEE1          ; DISPLAY BLANK CHAR
    42CE 42050000            NOP      NOT_SEE2,HP       ; DISPLAY BLANK W/ HSYNC
    42D0 4805C2CA            LOOPBACK        NOT_SEE3,0X01,LP21X      ; DISPLAY BLANK, INC LPCTR,
                                                        ; IF LPCTR < STOP ROW, LPBACK
                                                        ; ELSE GOTO NEXT INSTRUCTION
                         ;
                         ;       22TH LINE DISPLAY, STARTING ADDR IN 1EE0H
                         ;
    42D2 3016                ROW      0X16              ; ROW NUMBER
    42D3 242F                LOOP     0X01,0X0F         ; SETUP 16 SCAN LINES
                         LP22X:
    42D4 80501EDF            DISPLAY 0X1EDF,ROW_MAX      ; DISPLAY 80 CHAR, START FROM ADDR 1EE0
    42D6 40020000            NOP      NOT_SEE1          ; DISPLAY BLANK CHAR
    42D8 42050000            NOP      NOT_SEE2,HP       ; DISPLAY BLANK W/ HSYNC
    42DA 4805C2D4            LOOPBACK        NOT SEE3.0X01.LP22X      ; DISPLAY BLANK. INC LPCTR.
```

BEST AVAILABLE COPY

```
                                                ; IF LPCTR < STOP ROW, LPBACK
                                                ; ELSE GOTO NEXT INSTRUCTION
                   ;
                   ;     23TH LINE DISPLAY, STARTING ADDR IN 1F30H
                   ;
42DC 3017                ROW     0X17           ; ROW NUMBER
42D0 242F                LOOP    0X01,0X0F      ; SETUP 16 SCAN LINES
                 LP23X:
42DE 80501F2F            DISPLAY 0X1F2F,ROW_MAX     ; DISPLAY 80 CHAR, START FROM ADDR 1F30
42E0 40020000            NOP     NOT_SEE1       ; DISPLAY BLANK CHAR
42E2 42050000            NOP     NOT_SEE2,HP    ; DISPLAY BLANK W/ HSYNC
42E4 4805C2DE            LOOPBACK        NOT_SEE3,0X01,LP23X     ; DISPLAY BLANK, INC LPCTR,
                                                ; IF LPCTR < STOP ROW, LPBACK
                                                ; ELSE GOTO NEXT INSTRUCTION
                   ;
                   ;     24TH LINE DISPLAY, STARTING ADDR IN 1F80H
                   ;
42E6 3018                ROW     0X18           ; ROW NUMBER
42E7 242F                LOOP    0X01,0X0F      ; SETUP 16 SCAN LINES
                 LP24X:
42E8 80501F7F            DISPLAY 0X1F7F,ROW_MAX     ; DISPLAY 80 CHAR, START FROM ADDR 1F80
42EA 40020000            NOP     NOT_SEE1       ; DISPLAY BLANK CHAR
42EC 42050000            NOP     NOT_SEE2,HP    ; DISPLAY BLANK W/ HSYNC
*                                                          page 15

line adr code      input
42EE 4805C2E8            LOOPBACK        NOT_SEE3,0X01,LP24X     ; DISPLAY BLANK, INC LPCTR,
                                                ; IF LPCTR < STOP ROW, LPBACK
                                                ; ELSE GOTO NEXT INSTRUCTION
                   ;
                   ;     1 SCAN LINES FOR SEPARATOR
                   ;
42F0 3019                ROW     0X19           ; ROW NUMBER
42F1 2421                LOOP    0X01,0X01      ; SETUP 1 SCAN LINES
                 LP25X:
42F2 9050099F            DISPLAY 0X099F,ROW_MAX,S   ; DISPLAY 80 CHAR, START FROM ADDR 09FF
42F4 40020000            NOP     NOT_SEE1       ; DISPLAY BLANK CHAR
42F6 42050000            NOP     NOT_SEE2,HP    ; DISPLAY BLANK W/ HSYNC
42F8 4805C2F2            LOOPBACK        NOT_SEE3,0X01,LP25X     ; DISPLAY BLANK, INC LPCTR,
                                                ; IF LPCTR < STOP ROW, LPBACK
                                                ; ELSE GOTO NEXT INSTRUCTION
                   ;
                   ;     STATUS LINE DISPLAY, STARTING ADDR IN 1800H
                   ;
42FA 242D                LOOP    0X01,0X0D      ; SETUP 14 SCAN LINES
                 LP26X:
42FB 905017FF            DISPLAY 0X17FF,ROW_MAX,S   ; DISPLAY 80 CHAR, START FROM ADDR 1800
42FD 40020000            NOP     NOT_SEE1       ; DISPLAY BLANK CHAR
42FF 42050000            NOP     NOT_SEE2,HP    ; DISPLAY BLANK W/ HSYNC
4301 4805C2FB            LOOPBACK        NOT_SEE3,0X01,LP26X     ; DISPLAY BLANK, INC LPCTR,
                                                ; IF LPCTR < STOP ROW, LPBACK
                                                ; ELSE GOTO NEXT INSTRUCTION
4303 905017FF            DISPLAY 0X17FF,ROW_MAX,S   ; DISPLAY 80 CHAR, START FROM ADDR 1800
4305 50020000            NOP     NOT_SEE1,I     ; DISPLAY BLANK CHAR
4307 42050000            NOP     NOT_SEE2,HP    ; DISPLAY BLANK W/ HSYNC
4309 40050000            NOP     NOT_SEE3       ; DISPLAY BLANK, INC LPCTR,
                                                ; IF LPCTR < STOP ROW, LPBACK
                                                ; ELSE GOTO NEXT INSTRUCTION
                   ;
                   ;     DISPLAY 8 BLANK SCAN LINES
                   ;
430B 2427                LOOP    0X01,0X07      ; SETUP 8 SCAN LINES
                 LP27X:
430C 40530000            NOP     ROW_MAX+NOT_SEE1       ; DISPLAY BLANK CHAR
430E 42050000            NOP     NOT_SEE2,HP    ; DISPLAY BLANK W/ HSYNC
4310 4805C30C            LOOPBACK        NOT_SEE3,0X01,LP27X     ; DISPLAY BLANK, INC LPCTR,
                                                ; IF LPCTR < STOP ROW, LPBACK
                                                ; ELSE GOTO NEXT INSTRUCTION
                   ;
                   ;     DISPLAY 16 BLANK SCAN LINES W/ VSYNC
                   ;
4312 242F                LOOP    0X01,0X0F      ; SETUP 16 SCAN LINES
                 LP28X:
4313 41530000            NOP     ROW_MAX+NOT_SEE1,VP    ; DISPLAY BLANK CHAR
4315 43050000            NOP     NOT_SEE2,HP,VP ; DISPLAY BLANK W/ HSYNC
4317 4905C313            LOOPBACK        NOT_SEE3,0X01,LP28X,VP  ; DISPLAY BLANK, INC LPCTR,
                                                ; IF LPCTR < STOP ROW, LPBACK
*                                                          page 16

line adr code      input
                                                ; ELSE GOTO NEXT INSTRUCTION
                   ;
                   ;     DISPLAY 16 BLANK SCAN LINES
                   ;
4319 242D                LOOP    0X01,0X0D      ; SETUP 15 SCAN LINES
                 LP29X:
431A 40530000            NOP     ROW_MAX+NOT_SEE1       ; DISPLAY BLANK CHAR
431C 42050000            NOP     NOT_SEE2,HP    ; DISPLAY BLANK W/ HSYNC
431E 4805C31A            LOOPBACK        NOT_SEE3,0X01,LP29X     ; DISPLAY BLANK, INC LPCTR
                                                ; IF LPCTR < STOP ROW, LPBACK
                                                ; ELSE GOTO NEXT INSTRUCTION
                   ;
                   ;     SETUP START ADDRESS AND JUMP BACK
```

```
     4320 2421          ;
                              LOOP    0X01,0X01          ; SETUP 1 SCAN LINES
     4321 40530000            NOP     ROW_MAX+NOT_SEE1          ; DISPLAY BLANK CHAR
     4323 42050000            NOP     NOT_SEE2,HP        ; DISPLAY BLANK W/ HSYNC
     4325 44050A00            JMP     NOT_SEE3,MODE2_START     ; DISPLAY BLANK, INC LPCTR,
                                                         ; IF LPCTR < STOP ROW, LPBACK
                                                         ; ELSE JUMP TO START OF DL
                        ;
                              END
```

What is claimed is:

1. For use in combination with a video display, a program memory for storing instructions, a display memory for storing display data items, and a font memory for storing font data, terminal control circuitry comprising:

means for fetching instructions from the program memory;

means, responsive to a predetermined type of instruction fetched from the program memory wherein the predetermined type of instruction specifies a starting address in the display memory and a character string length, for (1) retrieving a display data item from each of a number of contiguous storage locations in the display memory, starting at the specified starting address, said number being the specified string length, and (2) retrieving font data from the font memory for each display data item retrieved from the display memory, to generate a pixel pattern for a character segment of a scan line; and means, responsive to an additional predetermined type of instruction fetched from the program memory wherein the additional predetermined type of instruction specifies a number of blanks, for converting each specified blank to a blank segment of a scan line.

2. For use in combination with a video display, a program memory for storing instructions, a display memory for storing display data items, and a font memory for storing font data, terminal control circuitry comprising:

video data queue means, having a queue input and a queue output, for storing entries communicated to said queue input and presenting stored entries at said queue output in FIFO fashion;

character output means, coupled to the font memory and responsive to entries at said queue output, for placing a character segment of a scan line on the display for each entry at said queue output; and control means, responsive to instructions fetched from the program memory, for directing operations in accordance with the instructions fetched;

said control means including means, responsive to a predetermined type of instruction, designated a DISPLAY STRING instruction, fetched form the program memory wherein said DISPLAY STRING instruction specifies a starting address and a character string length, for (1) retrieving a display data item from each of a number of contiguous storage locations in the display memory, starting at the specified starting address, said number being the specified string length, and (2) communicating each display data item, so retrieved, to said queue input as at least a portion of an entry.

3. The terminal control circuitry of claim 2 wherein each of said entries includes at least a portion that represents a font memory location, an wherein said character output means comprises:

font memory access means, responsive to a given entry at said queue output, for retrieving font data stored at a font memory location represented by said given entry; and video conversion means, responsive to said font data, for generating signals operative to place said font data on the display.

4. The terminal control circuitry of claim 2 wherein said control means further comprises:

means, responsive to two predetermined types of instructions, designated LOOP and LOOPBACK instructions, fetched from the program memory, said LOOP instruction specifying a series of scan lines, said LOOPBACK instruction specifying a transfer address, for (1) executing a sequence of instructions following an occurrence of said LOOP instruction until said LOOPBACK instruction is encountered by said control means, and (2) branching to the instruction immediately following said LOOP instruction until said sequence of instructions has been executed for all scan lines in the specified series.

5. The terminal control circuitry of claim 4 wherein said LOOPBACK instruction further specifies a number of blanks, and wherein said control means further comprises:

means, responsive to said LOOPBACK instruction, for communicating in response to each specified blank a data item representing a blank segment of a scan line to said queue input as at least a portion of an entry.

6. The terminal control circuitry of claim 2 wherein said control means further comprises:

means, responsive to a predetermined type of instruction fetched from the program memory, designated a blank display instruction, said blank display instruction specifying a number of blanks, for communicating in response to each specified blank a data item representing a blank line segment to said queue input as at least a portion of an entry.

7. The terminal control circuitry of claim 2 wherein said control means further comprises:

means, responsive to two additional predetermined types of instructions, designated LOOP and LOOPBACK instructions, fetched from the program memory, said LOOP instruction specifying a range of scan lines within a given character row on the display, said LOOPBACK instruction specifying a transfer address and a loop increment, for (1) executing a sequence of instructions following an occurrence of said LOOP instruction until said LOOPBACK instruction is encountered by said control means, and (2) branching to the instruction immediately following said LOOP instruction and incrementing the scan line by the loop increment until said sequence of instructions has been executed for all scan lines specified by the range and the loop increment.

8. The terminal control circuitry of claim 2 wherein said control means further comprises:

means, responsive to two additional predetermined tion is encountered by said control means; and means for comparing the content of said scan stop register with the output of said adder to determine whether said sequence of instructions has been executed for all scan lines in the specified sequence.

15. The terminal control circuitry of claim 13 wherein said string length means comprises:

a count value register having an input coupled to said instruction register; and a down counter having an input coupled to said count value register, said down counter operating to count down in response to a signal from said display memory access means signifying a successful memory access.

16. The terminal control circuitry of claim 13 wherein said display memory address means comprises:

an address counter having an input coupled to said address register, said address counter operating to count up in response to a signal from said display memory access means signifying a successful memory access.

17. A terminal controller for use with a display that responds to horizontal sync and vertical sync pulses, a program memory for storing instructions, and a data memory for storing data including display data, comprising:

a main processor for performing terminal communications; and a display list processor, responsive to instructions fetched from the program memory for directing operations in accordance with the instructions fetched, including (a) means, responsive to at least a first subset of instructions, for accessing display data from portions of the data memory, (b) means, responsive to at least a second subset of instructions, for displaying scan lines in a specified order, and (c) means, responsive to at least a third subset of instructions, for controlling the horizontal sync and vertical sync pulses for the display.

18. The terminal controller of claim 17 wherein said main processor and said display list processor are integrated on a single semiconductor chip.

19. For use in combination with a video display, a program memory for storing instructions, a display memory for storing display data items, and a font memory for storing font data, terminal control circuitry comprising:

means for fetching instructions from the program memory;

means, responsive to a predetermined type of instruction fetched from the program memory wherein the predetermined type of instruction specifies a starting address in the display memory and a character string length, for (1) retrieving a display data item form each of a number of contiguous storage locations in the display memory, starting at the specified starting address, said number being the specified string length, and (2) retrieving font data from the font memory for each display data item retrieved from the display memory, to generate a pixel pattern for a character segment of a scan line; and means, responsive to the occurrence of an additional predetermined type of instruction fetched from the program memory wherein the additional predetermined type of instruction specifies a number of blanks and has timing fields that permit specification of horizontal sync and vertical sync pulses, for (1) converting each specified blank to a blank segment of a scan line, and (2) generating horizontal sync and vertical sync pulses of duration corresponding to the specified number of blanks if the timing fields so specify.

20. For use in combination with a video display, a program memory for storing instructions, a display memory for storing display data items, and a font memory for storing font data, terminal control circuitry comprising:

means for fetching instructions from the program memory; and means, responsive to a predetermined type of instruction, designated a video instruction, fetched from the program memory wherein said video instruction specifies a number of display items and has timing fields that permit specification of horizontal sync and vertical sync pulses, for (1) converting each specified display item to a segment of a scan line, and (2) generating horizontal sync and vertical sync pulses of duration corresponding to the specified number of display items if the timing fields so specify;

wherein one type of video instruction specifies a starting address and a number of display data items, and wherein said means for converting includes means for (1) retrieving a display data item from each of a number of contiguous storage locations in the display memory, starting at the specified address, said number being the specified number of display items, and (2) converting each retrieved display data item to a character segment of a scan line.

21. The terminal control circuitry of claim 20 wherein one type of video instruction specifies a starting address and a number of display data items, and wherein said means for converting includes means for (1) retrieving a display data item from each of a number of contiguous storage locations in the display memory, starting at the specified address, said number being the specified number of display items, and (2) converting each retrieved display data item to a character segment of a scan line.

22. For use in combination with a video display, a program memory for storing instructions, a display memory for storing display data items, and a font memory for storing font data, terminal control circuitry comprising:

video data queue means, having a queue input and a queue output, for storing entries communicated to said queue input and presenting stored entries at said queue output in FIFO fashion;

character output means, responsive to entries at said queue output, for placing corresponding portions of characters on the display; and control means, responsive to instructions fetched from the program memory, for directing operations in accordance with the instructions fetched;

said control means including means, responsive to a predetermined type of instruction, designated a video instruction, fetched from the program memory wherein said video instruction specifies a number of display items, for (1) generating the specified number of display data items, (2) communicating each display data item, so generated, to said queue input as at least a portion of a queue entry.

23. The terminal control circuitry of claim 22 wherein each of said entries includes at least a portion that represents a font memory location, and wherein said character output means comprises:

BEST AVAILABLE COPY types of instructions, designated SET ROW and LOOPBACK instructions, fetched from the program memory, said SET ROW instruction specifying a given character row on the display, said LOOP instruction specifying a range of scan lines within a specified character row in the display, for (1) setting the character row to the specified value, (2) executing a sequence of instructions following the occurrence of said LOOP instruction to provide at least one data item representing a segment of at least one scan line in the specified range for the specified character row, and (3) communicating said at least one data item to said queue input as at least a portion of an entry.

9. For use in combination with a video display, a program memory for storing instructions, a display memory for storing display data items, and a font memory for storing font data, terminal control circuitry comprising:

scan line means for storing a range of scan lines and a current scan line;

string length mans for storing a string length and a current position in a string;

display memory address means for storing a starting display memory address and a current display memory address;

display memory access means, responsive to said current display memory address, for retrieving display data stored in said display memory at said current display memory address and for generating a signal signifying a successful memory access;

video data queue means, having a queue input and a queue output, for storing entries communicated to said queue input and presenting stored entries at said queue output in FIFO fashion;

means, responsive to said current scan line and said display data, for formulating entries and communicating said entries to said queue input, each of said entries including at least a portion that represents a font memory location;

font memory access means, responsive to a given entry at said queue output, for retrieving font data stored at a font memory location represented by said given entry;

video conversion means, responsive to said font data, for generating signals operative to place said font data on the display;

an instruction register;

means for fetching instructions from the program memory and loading said instructions in said instruction register; and control means, responsive to the content of said instruction register, for directing operations in accordance with the instructions fetched;

said control means including means, responsive to a predetermined type of instruction in said instruction register, designated a DISPLAY STRING instruction that specifies a string length and a starting address in the display memory, for (1) storing the specified string length and starting address in said string length means and said display memory address means, respectively, (2) activating said display memory access means a number of times corresponding to the specified string length to retrieve display data form a range of sequential locations starting at the specified starting address, and (3) activating said means for formulating entries; and said control means further including means, responsive to two predetermined instructions in said instruction register, designated LOOP and LOOPBACK instructions, said LOOP instruction specifying a series of scan lines, said LOOPBACK instruction specifying a transfer address, for (1) executing a sequence of instructions following the occurrence of said LOOP instruction until said LOOPBACK instruction is encountered by said control means, and (2) branching to the instruction immediately following said LOOP instruction until said sequence of instructions has been executed for all scan lines in the series specified by said LOOP instruction.

10. The terminal control circuitry of claim 9 wherein said scan line means comprises:

a scan stop register having an input coupled to said instruction register;

a scan count register;

an adder having an output, a first input coupled to said scan count register, and a second input coupled to said instruction register;

means for loading said scan count register from said instruction register when a LOOP instruction is encountered by said control means and from the output of said adder when a LOOPBACK instruction is encountered by said control means; and means for comparing the content of said scan stop register with the output of said adder to determine whether said sequence of instructions has been executed for all scan lines in the specified sequence.

11. The terminal control circuitry of claim 9 wherein said string length means comprises:

a count value register having an input coupled to said instruction register; and a down counter having an input coupled to said count value register, said down counter operating to count down in response to a signal from said display memory access means signifying a successful memory access.

12. The terminal control circuitry of claim 9 wherein said display memory address means comprises:

an address counter having an input coupled to said address register, said address counter operating to count up in response to a signal from said display memory access means signifying a successful memory access.

13. The terminal control circuitry of claim 9 wherein said control means further comprises:

means, responsive to an additional predetermined type of instruction, designated a blank display instruction that specifies a number of blanks, for (1) storing the specified number of blanks in said string length means, (2) generating a display data item representing a blank segment of a scan line, and (3) activating said means for formulating entries.

14. The terminal control circuitry of claim 13 wherein said scan line means comprises:

a scan stop register having an input coupled to said instruction register;

a scan count register;

an adder having an output, a first input coupled to said scan count register, and a second input coupled to said instruction register;

means for loading said scan count register from said instruction register when a LOOP instruction is encountered by said control means and from the output of said adder when a LOOPBACK instrucfont memory access means, responsive to a given entry at said queue output, for retrieving font data stored at a font memory location represented by said given entry; and video conversion means, responsive to said font data, for generating signals operative to place said font data on the display.

24. The terminal control circuitry of claim 22 wherein said control means further comprises:

means, responsive to two predetermined types of instructions, designated LOOP and LOOPBACK instructions, fetched from the program memory, said LOOP instruction specifying a series of scan lines, said LOOPBACK instruction specifying a transfer address, for (1) executing a sequence of instructions following an occurrence of said LOOP instruction until said LOOPBACK instruction is encountered by said control means, and (2) branching to the instruction immediately following said LOOP instruction until said sequence of instructions has been executed for all scan lines in the specified series.

25. The terminal control circuitry of claim 24 wherein said LOOPBACK instruction further specifies a number of blanks, and wherein said control means further comprises:

means, responsive to said LOOPBACK instruction, for communicating in response to each specified blank a data item representing a blank segment of a scan line to said queue input as at least a portion of an entry.

* * * * *